(12) United States Patent
Yamanouchi et al.

(10) Patent No.: US 7,054,355 B2
(45) Date of Patent: May 30, 2006

(54) SPREAD SPECTRUM SIGNAL PROCESSING APPARATUS AND SPREAD COMMUNICATION SYSTEM

(75) Inventors: Kazuhiko Yamanouchi, 37-13, Matsugaoka, Taihaku-ku, Sendai-shi (JP) 982-0821; Yasuhito Kanno, Fuji (JP); Hiroyuki Kato, Fuji (JP)

(73) Assignees: Asahi Kasei Kabushiki Kaisha (JP); Kazuhiko Yamanouchi (JP)

( * ) Notice: Subject to any disclaimer, the term of this patent is extended or adjusted under 35 U.S.C. 154(b) by 998 days.

(21) Appl. No.: 09/826,626

(22) Filed: Apr. 5, 2001

(65) Prior Publication Data

US 2001/0026581 A1    Oct. 4, 2001

Related U.S. Application Data

(63) Continuation of application No. PCT/JP99/05512, filed on Oct. 6, 1999.

(30) Foreign Application Priority Data

Oct. 6, 1998    (JP)    ................................. 10-284450

(51) Int. Cl.
H04B 1/707    (2006.01)
(52) U.S. Cl. ...................................... 375/150; 375/142
(58) Field of Classification Search ................ 375/142, 375/143, 150, 151, 152, 153, 343; 370/320, 370/335, 342, 441
See application file for complete search history.

(56) References Cited

U.S. PATENT DOCUMENTS 5,367,216 A    11/1994    Egara et al.    ............ 330/313 R
5,812,592 A    9/1998    Suzuki et al.    ................ 375/142
6,363,105 B1 *    3/2002    Sourour et al.    ............. 375/150
6,556,167 B1 *    4/2003    Disselkoen et al.    .... 342/357.06
6,621,855 B1 *    9/2003    Van Stralen et al.    ........ 375/142

FOREIGN PATENT DOCUMENTS

| EP | 0525784 A1 | 2/1993 |
|---|---|---|
| EP | 0717506 A2 | 6/1996 |
| JP | A- 02132938 | 5/1990 |
| JP | A- 05037291 | 2/1993 |
| JP | A- 05037292 | 2/1993 |
| JP | A- 05129885 | 5/1993 |
| JP | A- 05129886 | 5/1993 |
| JP | A- 05284140 | 10/1993 |
| JP | A- 07058669 | 3/1995 |
| JP | A- 08237173 | 3/1995 |

* cited by examiner

*Primary Examiner*—Betsy L. Deppe
(74) *Attorney, Agent, or Firm*—Dickstein, Shapiro, Morin & Oshinsky, LLP.

(57)    ABSTRACT

In a spread spectrum communication using a long spreading code, a spread spectrum signal processing apparatus is provided, which is suitable for performing communication by using a correlator having a size mountable on a portable equipment. The spread spectrum signal processing apparatus has a correlator for correlating between a spread spectrum signal and a given reference signal, an A/D converter for converting a correlation signal into a digital signal, a memory for storing the digital signal from the AD converter as digital data, a signal processor for summing digital data corresponding to each of divided codes $C_1$–$C_{16}$ and for outputting a result of summation, and a control unit for controlling to apply each of the divided codes $C_1$–$C_{16}$ in this order repeatedly as a reference signal to the correlator. The signal processor begins a summing process by making reference to a timing signal from the control unit.

8 Claims, 12 Drawing Sheets

SPREAD SPECTRUM SIGNAL PROCESSING APPARATUS AND SPREAD COMMUNICATION SYSTEM

CROSS-REFERENCE TO RELATED APPLICATIONS

This patent application is a continuation of PCT International Patent Application No. PCT/JP99/05512 filed Oct. 6, 1999.

TECHNICAL FIELD

The present invention relates to, in a spread spectrum communication, an apparatus for performing a synchronization recognition or a despreading, and to a system using this apparatus, and in particular, relates to, in a spread spectrum communication using a long spreading code, a spread spectrum signal processing apparatus and a spread spectrum communication system which is suitable for performing communication by using a correlator having a size mountable on a portable equipment.

BACKGROUND ART

In the prior art, spread spectrum communication is known as a communication providing high security. In a transmitter for spread spectrum communication, for example, digital data to be transmitted is spread over a wide frequency band by using a spreading code having a prescribed length, and then transmitted. In a receiver for spread spectrum communication, by using a code identical with the spreading code of the transmitter, the correlation between this spreading code and a received spread signal is determined and a correlation output peak is obtained. It is usually called a despreading demodulation to determine the correlation, to obtain a sequence of correlation peaks, and to retrieve the original digital signal based on this. In this despreading demodulation, there are two methods. In one method, after detecting a phase difference (synchronization recognition) between local signal generators respectively within the transmitter and the receiver based on time information of the correlation output from a correlator, the despreading demodulation is performed by obtaining the sequence of correlation peaks. In the other method, the despreading demodulation is performed by obtaining the sequence of correlation peaks directly from the correlator. As for the correlator used to detect the correlation, for example, a surface acoustic wave (SAW) device such as a surface acoustic wave convolver or a matched filter may be used.

In order to realize a spread spectrum communication with high quality, it is desirable to increase the length of the spreading code. It is known that by increasing the length of the spreading code, a process gain which is also an index of a suppression level of interference waves in the spread spectrum communication is improved.

However, when the length of the spreading code is increased, an interaction length to obtain the correlation is increased, resulting in an increase in size of the surface acoustic wave device, and various other problems. For example, in the surface acoustic wave convolver, a longitudinal length (interaction length) L of a convolution region required to obtain the correlation output is expressed by the following equation (1).

$$L = N \times V / Rc \quad (1)$$

where, N is the length (bits) of a spreading code, V is the velocity (m/s) of a surface acoustic wave, and Rc is the chip rate (cps).

In the next-generation mobile communication system such as an IMT-2000, etc., the length of a short code used for an initial synchronization acquisition is 256 bits, and the chip rate is 4 Mcps. Furthermore, since the velocity of surface acoustic wave of a 128 degree rotation Y cut -X direction propagation $LiNbO_3$ which is a typical surface acoustic wave substrate, is 4000 m/s, when a surface acoustic wave convolver is manufactured by using such a piezo-electric substrate, an interaction length L will be 256 mm according to the above equation (1). Generally, when the size of the piezo-electric substrate reaches 100 mm or larger, since the manufacture of the piezo-electric substrate itself is technically difficult, it is very difficult to obtain such a piezo-electric substrate, and even when it is obtained, it will be very expensive.

On the other hand, the size in an orthogonal direction (hereinafter, referred to as a width direction) to the above-mentioned longitudinal direction may be sufficient if it is in the order of several hundred λ, (λ is the wavelength of the surface acoustic wave) although it depends on a type or a structure of an interdigital electrode. In this case, the shape of the piezo-electric substrate required to manufacture the surface acoustic wave convolver will be very elongate shape. Since most of the shapes of the piezo-electric wafers available in the market are circular, in order to cut out a piezo-electric substrate required for the surface acoustic wave convolver without waste, it is necessary not only its size is smaller than that of the piezo-electric wafer but also the lengths in the ongitudinal direction and in the width direction are not different to a great extent. It is an important problem which directly reflects on the manufacturing cost of the surface acoustic wave convolver, how many piezo-electric substrates can be cut out from one sheet of piezo-electric wafer.

Accordingly, when the shape of the piezo-electric substrate is very elongate, since it is impossible to cut out many piezo-electric substrates from one sheet of piezo-electric wafer, there is a problem that the manufacturing cost is increased remarkably. Furthermore, when the shape of the piezo-electric substrate is very elongate, there is another problem that the mechanical bending strength becomes very weak, and the handling is difficult.

Furthermore, a problem also arises in an optical mask and an exposing device required for forming an electrode pattern on the piezo-electric substrate by a photolithography technique or the like. Specifically, the optical mask can be manipulated, at the present time, for an electrode pattern of about 130 mm or less, and it is impossible to manipulate for the electrode pattern exceeding this limit. Also, since usual exposing devices are designed to form an electrode pattern less than 100 mm, a large modification is required for the electrode pattern of 100 mm or larger.

Furthermore, as one of important applications of the surface acoustic wave convolver, the use as a part of a mobile communication handy terminal may be considered, that is, as a correlator in a CDMA (Code-Division Multiple Access) system using a spread spectrum communication by a DS (Direct Sequence) system. The progress in the recent miniaturizing technique of handy terminal for mobile communication is remarkable, and as an example, a mobile phone having a size of 130 mm (length)×41 mm (width)×25 mm (thickness) has been in practical use. For this reason, when the surface acoustic wave convolver is to be used in the handy terminal, it is a mandatory condition that the size of the surface acoustic wave convolver is small as compared with the handy terminal.

Therefore, in the spread spectrum communication using a long spreading code, it has been essentially impossible to mount an analog correlator such as a surface acoustic wave convolver and a surface acoustic wave matched filter and the like having a size as large as 256 mm on the handy terminal.

The present invention was made in view of the unsolved problems in the prior art, and it is an object to provide a spread spectrum signal processing apparatus and a spread spectrum communication system suitable for communication by using a correlator having a size mountable on a portable equipment in a spread spectrum communication using a long spreading code.

DISCLOSURE OF INVENTION

In order to achieve the above object, a spread spectrum signal processing apparatus of the present invention, comprises a correlator for detecting a correlation between a spread spectrum signal and a given reference signal, and processes a correlation signal from the correlator, and wherein each of the divided codes obtained by dividing into plurality a spreading code of a prescribed length for despreading the spread signal is applied sequentially to the correlator as a reference signal in accordance with the order of arrangement in the spreading code, and the correlation signal output corresponding to the each of the divided codes is summed, and the result of the summation is output.

In this construction, each of the divided codes is sequentially applied as a reference signal to the correlator in accordance with the order of arrangement in the spreading code. In the correlator, when the reference signal as each divided code is applied, the correlation between the reference signal as each divided code and the spread signal is determined, and its result is output as the correlation signal. When the correlation signal is output corresponding to each divided code, these correlation signals are summed, and the summed result is output.

More specifically, when the spread signal which is spread as a spread spectrum signal by an identical code with the spreading code is input to the correlator, in the correlation signal which is output corresponding to each divided code, a peak appears at the same position on the basis of the timing at which each divided code is applied. Accordingly, when the correlation signals are summed, since all the peak positions are overlapped, in the summed result, a peak of a further higher level appears. This means that this result is equivalent to that which is obtained when the correlation processing is performed by using the spreading code as it is without dividing the spreading code.

Furthermore, when a spread spectrum signal by using a code different from the spreading code is input to the correlator, in each correlation signal which is output corresponding to each divided code, a peak appears at a different position on the basis of the timing at which each code is supplied, or no peak appears. As a result, even when these correlation signals are summed, since all the peaks are not overlapped, no higher level peak appears in the summed result.

As described above, in the correlator, since it is allowed to perform the correlation processing by using divided codes whose length is shorter than that of the spreading code, there is no need to use a correlator having an interaction length corresponding to the length of the spreading code, and a correlator having an interaction length corresponding to the length of the divided codes may be used. For example, when the length of the spreading code is 256 bits, assuming that the length of each divided code is 64 bits, it is only necessary to use the correlator having the interaction length of 64 mm according to the above-mentioned equation (1).

The spread spectrum signal processing apparatus according to the present invention comprises a correlator for determining a correlation between a spread spectrum signal and a given reference signal, and processes a correlation signal from the correlator, and further comprises control means for controlling the supply of each divided code, which is obtained by dividing a spreading code of a prescribed length into a plurality of divided codes, as a reference signal to the correlator sequentially in accordance with the order of arrangement in the spreading code, and signal processing means for summing the correlation signals output from the correlator and for outputting a summed result.

In this construction, each divided code is sequentially applied to the correlator as the reference signal by the control means in accordance with the order of arrangement in the spreading code. In the correlator, when the reference signal is applied as each divided code, the correlation between the reference signal as each divided code and the spread signal is determined, and its result is output as the correlation signal. When the correlation signal is output corresponding to each divided code, the correlation signal is summed by the signal processing means, and the summed result is output.

Therefore, in the correlator, since it is allowed to perform the correlation processing by using divided codes whose length is shorter than that of the spreading code, there is no need to use a correlator having an interaction length corresponding to the length of the spreading code, and a correlator having an interaction length corresponding to the length of the divided codes may be used.

Furthermore, in the spread spectrum signal processing apparatus according to the present invention, the signal processing means comprises an A/D converter for converting the correlation signal into a digital signal, memory means for storing the digital signal from the A/D converter as digital data, and a signal processor for summing the digital data corresponding to the each divided code and outputting a result of the summation, and wherein the signal processor starts the summing of the digital data by making reference to the timing at which the control means applies the each divided code to the correlator.

In this construction, as a result of applying the each divided code to the correlator as the reference signal, when the correlation signal is output corresponding to the each divided code, the correlation signals are sequentially converted into the digital signal by the A/D converter, and stored in the memory means as digital data. And, as the summing of the digital data is started by making reference to the timing at which the control means applies the divided code to the correlator, the digital data corresponding to each divided code is summed, and the result of the summation is output.

Furthermore, in the spread spectrum signal processing apparatus according to the present invention, the signal processing means comprises a plurality of delay elements each for delaying a signal by a time duration corresponding to the length of the divided code, and the plurality of delay elements are connected in cascade, and the output of the correlator is connected to the input of each delay element and to the output of the last stage of the plurality of delay elements.

In this construction, as a result of supplying the each divided code to the correlator as the reference signal, when the correlation signal is output corresponding to the each divided code, the correlation signal is summed by each delay element on the basis of the timing at which each divided code is applied, and the result of the summation is output.

Furthermore, in the spread spectrum signal processing apparatus according to the present invention, the signal processing means comprises a plurality of delay elements each for delaying a signal by a time duration corresponding to the length of the divided code, and an adder for summing a delayed signal from each delay element and the correlation signal, and wherein the delay elements are connected in cascade, and the output of the correlator is connected to the input of the delay element at the first stage.

In this construction, as a result of applying each divided code to the correlator as the reference signal, when the correlation signal is output corresponding to the each divided code, the correlation signals are summed by each delay element and the adder on the basis of the timing at which each divided code is applied, and the result of the summation is output.

Furthermore, in the spread spectrum signal processing apparatus, any divided code has the same length.

In the construction in which the number of divisions of the spreading code is the same, if the each divided code has the same length. a correlator having a minimum interaction length may be used.

Furthermore, in the spread spectrum signal processing apparatus, the correlator is a surface acoustic wave convolver, and the each divided code has the same length as or shorter length than the code length corresponding to the interaction length of the convolver.

In this construction, there is no need to use the surface acoustic wave convolver having the interaction length corresponding to the spreading code, but the surface acoustic wave convolver having the interaction length corresponding to the divided code may be used.

Here, it is preferable to use the surface acoustic wave convolver having the interaction length corresponding to the spreading code, and for example, a piezo-electric type, a semiconductor/piezo-electric type, and piezo-electric/semiconductor type may be used. In particular, in order to utilize in the IMT-2000, since a sufficient S/N ratio is required for the output of the surface acoustic wave convolver, it is preferred to use the surface acoustic wave convolver having the interaction length of 32 chips or more.

Furthermore, in a spread spectrum signal processing apparatus, the control means, until a peak of the correlation signal is detected, controls to generate successively as the reference signal a divided code among the divided codes positioned at a prescribed order in the arrangement of the spreading code, which divided codes being produced by dividing the spreading code of a prescribed length used for despreading the spread signal into plurality, and after a peak of the correlation signal is detected, each of the divided codes is generated as a reference signal sequentially from the next one of the prescribed order in accordance with the arrangement order.

In such a construction, until the peak of the correlation signal is detected, one of the divided codes at the prescribed order in the arrangement of the spreading code is generated, and when such a generated reference signal and the spread signal are input into the correlator, a correlation between the spread signal and the reference signal is determined, and this result is output as a correlation signal.

In such a condition, when a part of the spread signal which coincides with the divided code is input into the correlator, a correlation signal including a peak of a high level is output by the correlator, and its correlation signal is detected and the peak is detected.

After the peak of the correlation signal is detected, each of the divided codes is made to generate by the control means as a reference signal sequentially in accordance with the order of arrangement in the spreading code. However, the start of the generation is begun with the next one of the divided code at the prescribed order. By virtue of this, in the case where a correlator corresponding to the length of the divided code is used, even when a phase difference between the spread signal and the reference signal is longer than the length of the divided code, it is possible to acquire the spread signal with relative certainty.

On the other hand, in order to achieve the above object, a spread spectrum communication system according to the present invention is a spread spectrum communication system to perform the communication between at least two communication equipments by a spread spectrum signal, and the communication equipment comprises synchronization detecting means for detecting synchronization of the spread signal, and despreading means for performing despreading on the spread signal by making reference to a synchronization recognition signal from the synchronization detecting means, and wherein the spread spectrum signal processing apparatus according to is applied to either one of the synchronization detecting means and the despreading means.

In such a construction, as the correlator which is used in either one of the synchronization detecting means and the despreading means, there is no need to use a correlator having an interaction length corresponding to the length of the spreading code, and a correlator having an interaction length corresponding to the length of the divided code may be used.

BRIEF DESCRIPTION OF THE DRAWINGS

FIGS. 3(a) to 3(c) are also collectively referred to as FIG. 3 in the description below.

FIGS. 4(a) and 4(b) are also collectively referred to as FIG. 4 in the description below.

FIGS. 5(a) and 5(b) are also collectively referred to as FIG. 5 in the description below.

FIGS. 12(a) and 12(b) are also collectively referred to as FIG. 12 in the description below.

BEST MODE FOR CARRYING OUT THE INVENTION

Hereinafter, a first embodiment of a spread spectrum signal processing apparatus according to the present invention will be described with reference to the drawings. FIGS. 1 to 4 are diagrams showing the first embodiment of the spread spectrum signal processing apparatus according to the present invention.

In this first embodiment, the spread spectrum signal processing apparatus according to the present invention is applied to the case in which the synchronization recognition of a spread spectrum signal is performed by a digital processing in a spread spectrum communication using a spreading code of 256 bits, as in the next generation mobile communication system such as IMT-2000 or the like. More specifically, in a communication equipment which comprises a synchronization detector for detecting synchronization of the spread spectrum signal, and a despreading circuit for despreading the spread signal by making reference to the synchronization recognition signal from the synchronization detector, and which performs communication by the spread spectrum signal, the spread spectrum signal processing apparatus according to the present invention is applied to the synchronization detector. In this respect, as the spreading code, for example, according to the IMT-2000, a Gold code of 256 bits is used.

Figure 1:
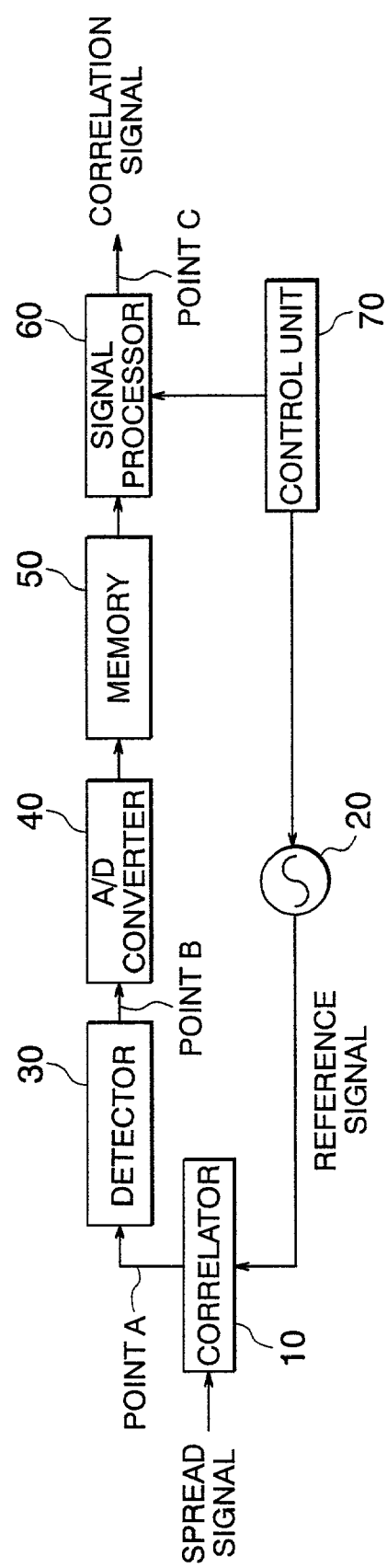
FIG. 1 shows a block diagram of a first circuit construction for a spread spectrum signal processing according to the present invention.

First, the construction of the spread spectrum signal processing apparatus will be described with reference to FIG. 1. FIG. 1 is a block diagram showing a first circuit construction of the spread spectrum signal processing apparatus according to the present invention.

The spread spectrum signal processing apparatus according to the present invention, as shown in FIG. 1, comprises a correlator 10 for determining a correlation between a spread spectrum signal and a reference signal applied thereto, a reference signal generator 20 for producing the reference signal and applying the same to the correlator 10, a detector 30 for shaping the correlation signal from the correlator 10, an A/D converter 40 for converting the correlation signal from the detector 30 into a digital signal at a prescribed sampling frequency, a memory 50 for storing the digital signal from the A/D converter as digital data, a signal processor 60 for performing a signal processing on the digital data of the memory 50, and a control unit 70 for controlling the reference signal generator 20 and the signal processor 60.

The correlator 10 is formed by a surface acoustic wave convolver, which has an interaction length corresponding to a length (16 bits) of 1/16 of a length of a spreading code (for example, a spreading code X) for despreading a spread signal. A correlation processing of the spread signal and the reference signal is performed as a unit of 1/16 of the length of the spreading code X. In this case, the interaction length L is 16 mm according to the above-mentioned equation (1).

The reference signal generator 20 divides beforehand the spreading code X into a plurality of codes $C_1$–$C_{16}$ each having a length corresponding to 1/16 of the spreading code x so that the each code has the length corresponding to the interaction length of the correlator 10, and ouputs each of the divided codes $C_1$–$C_{16}$ to the correlator 10 as a reference signal under the control of the control unit 70.

The detector 30 performs a full-wave rectification of the correlation signal from the correlator 10 so that the correlation signal can be digitally converted in the A/D converter 40, and performs a frequency conversion so as to make the correlation signal to have a lower frequency.

The control unit 70 controls the reference signal generator 20 so that each of the divided codes $C_1$–$C_{16}$ is repeatedly applied in this order to the correlator 10, and also, at the time of performing the control of applying the code $C_1$ again after performing the control of applying the code $C_{16}$, outputs to the signal processor 60 a timing signal indicative of the timing of application of the code $C_1$.

The signal processor 60 upon receiving the timing signal from the control unit 70, starts the summing process of digital data within the memory 50, and outputs summed result. This summing process sums digital data corresponding to each of the divided codes $C_1$–$C_{16}$ on the basis of the timing at which each of the divided codes $C_1$–$C_{16}$ is applied to the correlator 10. At this time, the starting position of each digital data with in the memory 50 is specified based on the length of each of the divided codes $C_1$–$C_{16}$ and the sampling rate of the A/D converter 40.

Figure 2:
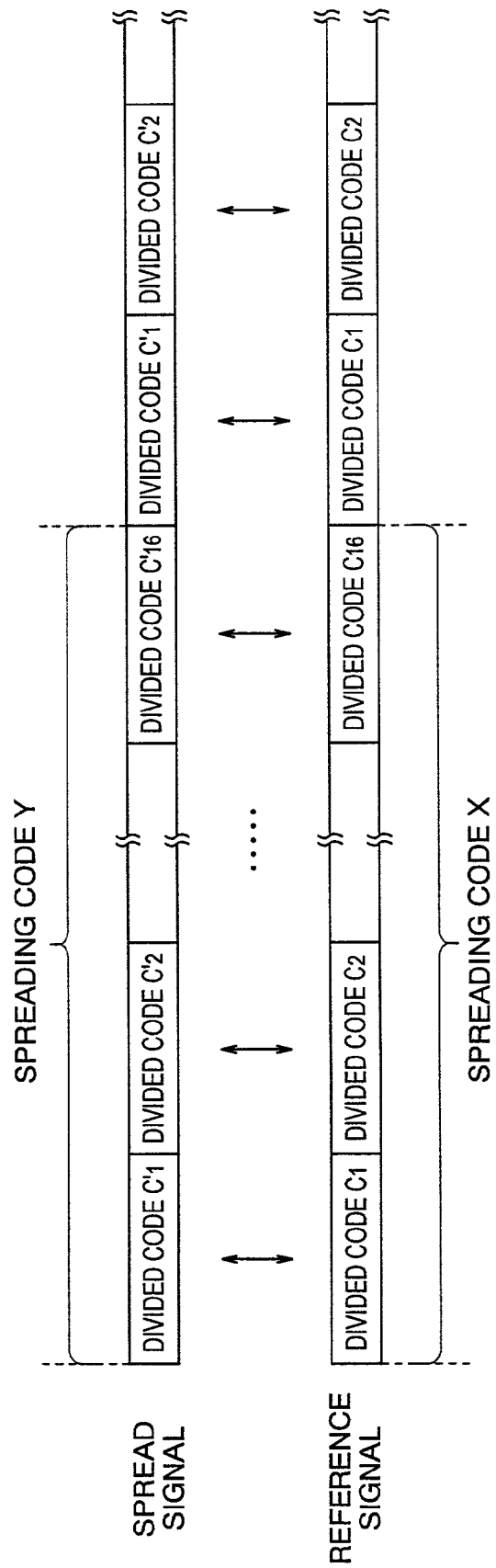
FIG. 2 is a diagram showing an example of correlation processing in the correlator 10.
Figure 3:
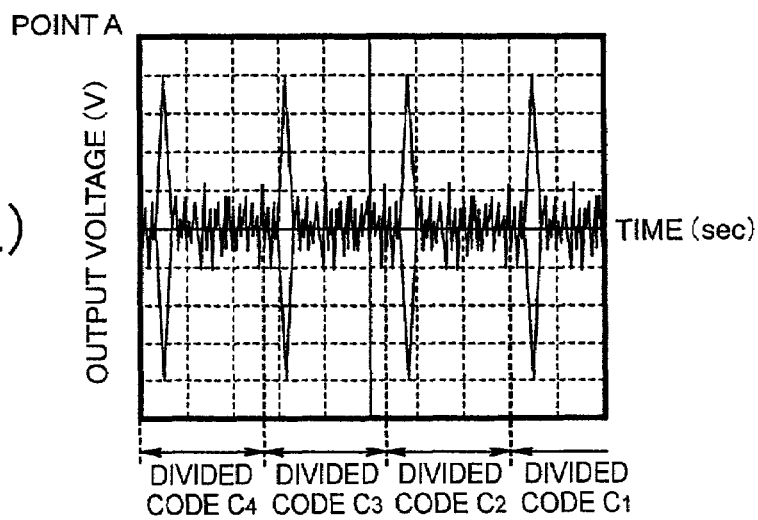
FIGS. 3(a) to 3(c) show time charts of correlation signals at points A–C in FIG. 1, respectively.
Figure 3:
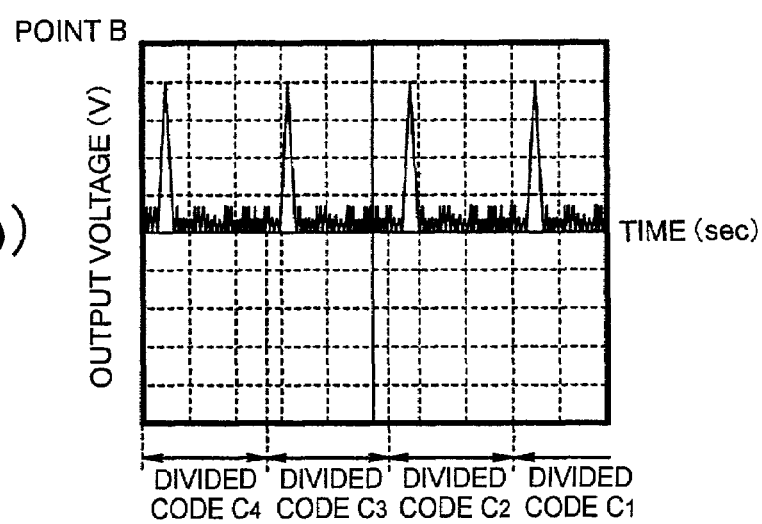
Figure 3:
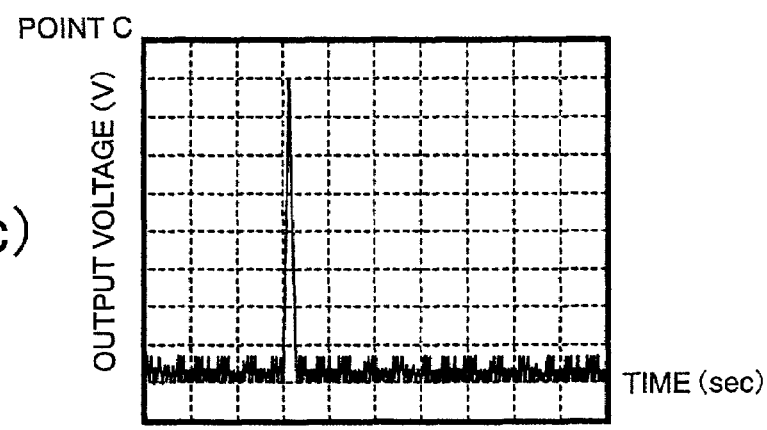
Figure 4:
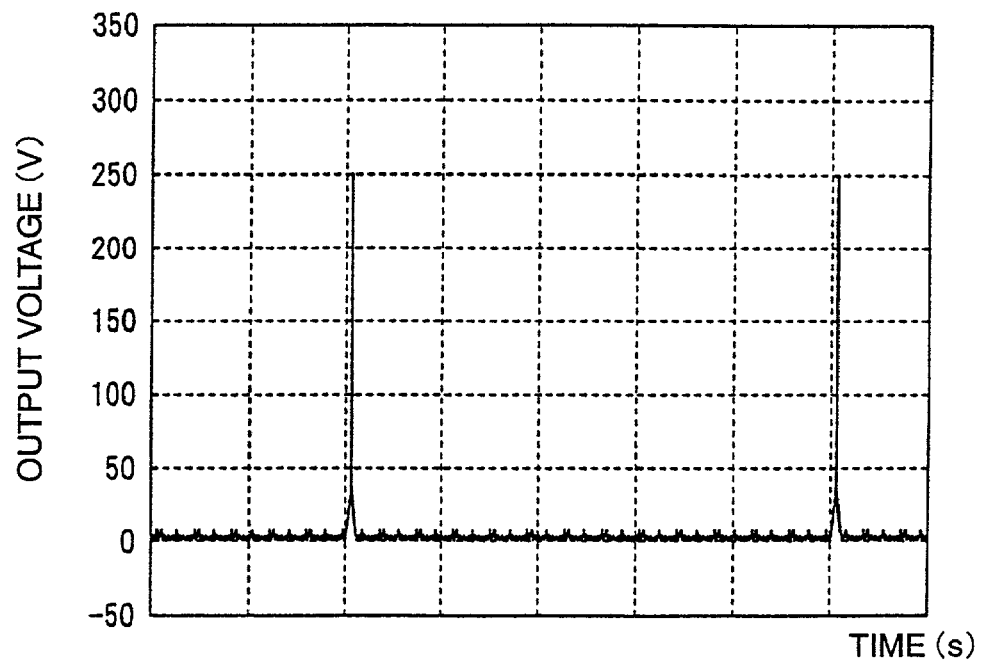
FIGS. 4(a) and 4(b) compare time charts of an example according to the present invention with the prior art.
Figure 4:
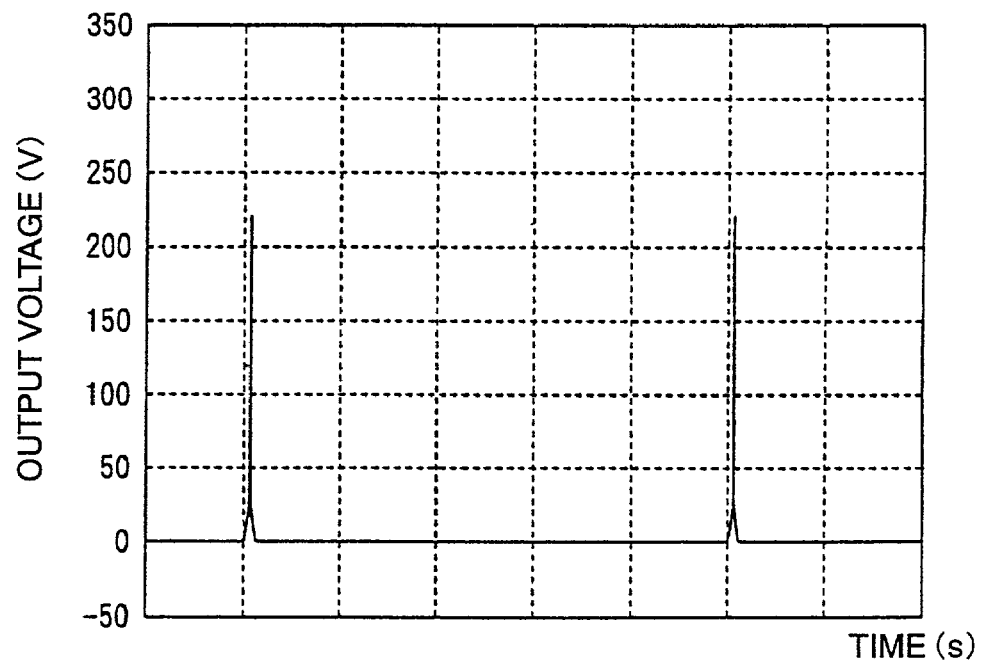

Next, the operation of the above first embodiment will be described with reference to FIGS. 2 to 4. FIG. 2 is a diagram showing an example of the correlation process in the correlator 10, and FIG. 3 shows time charts showing correlation signals at points A to C respectively, and FIG. 4 shows a comparison example with the prior art.

First, when the reference signal oacillator 20 is controlled by the control unit 70, each of the divided codes $C_1$–$C_{16}$ is applied in this order to the correlator 10 repeatedly as a reference signal. In this case, at a time point at which the divided code $C_1$ is applied, for example, as shown in FIG. 2, when a spread spectrum signal by a spreading code Y is input to the correlator 10, supposing that the spreading code Y is made up of a plurality of divided codes $C'_1$–$C'_{16}$ each having a length corresponding to 1/16 of the spreading code Y, in the correlator 10, a correlation process is performed between the divided code $C_1$ of the spreading code X and the divided codes $C'_1$ of the spreading code Y, and its correlation signal is output. In the same manner, a correlation process is performed between the divided codes $C_2$–$C_{16}$ of the spreading code X and the divided codes $C'_2$–$C'_{16}$ of the spreading code Y respectively, and its correlation signals are output sequentially.

As mentioned above, when the correlation signals are output sequentially corresponding to each of the divided codes $C_1$–$C_{16}$, the correlation signals from the correlator 10 are shaped by the detector 30, and the correlation signals from the detector 30 are converted into digital signals, and these digital signals are stored in the memory 50 as digital data. In the memory 50, the digital data is stored, for example, by a FIFO method.

On the other hand, in the control unit 70, after performing the control to apply the divided code $C_{16}$, when performing the control to apply the divided code $C_1$ again, a timing signal indicative of its timing is output to the signal processor 60. In the signal 60, when the timing signal is input from the control unit 70, the summing process is started to sum the digital data within the memory 50 corresponding to each of the divided codes $C_1$–$C_{16}$, and the summed result is output.

Since the processing of the correlation signals is performed as mentioned above, when the spread signal which has been spread in spectrum by the same code as the spreading code X is input, the correlation signals which are output respectively corresponding to the divided codes $C_1$–$C_{16}$ are as shown in FIG. 3 (a). FIG. 3 (a) is a time chart showing the correlation signals output from the correlator 10 at a point A in FIG. 1.

More specifically, in FIG. 3 (a), at the time when the divided code $C_1$ is applied to the correlator 10 as a reference signal, if a portion of the spread signal corresponding to the divided code $C_1$ is input, which spread signal has been spread in spectrum by the same code as the spreading code X, a peak appears in the correlation signal at a prescribed position indicating that the coincidence is obtained. Similarly, when divided codes $C_2$–$C_4$ are applied to the correlator 10 as reference signals, if portions of the spread signal corresponding to the divided code $C_2$–$C_4$ are input, which spread signal has been spread in spectrum by the same code as the spreading code X, peaks indicating the coincidence appear in the correlation signals at respectively the same positions as in the case of the divided code $C_1$.

When these correlation signals are input to the detector 30, in the detector 30, these correlation signals are shaped as shown in FIG. 3 (b) so that these signals can be converted digitally in the A/D converter 40, and then they are output. FIG. 3 (b) is a time chart showing the correlation signals output from the correlator 10 at a point B in FIG. 1.

Accordingly, when such correlation signals are summed after being stored as the digital data in the memory 50, since each digital data has a peak which appears at the same position, all the peaks are summed overlapped one another, and in the result of the summation as shown in FIG. 3(c), a peak of a further high level appears. FIG. 3(c) is a time chart showing the correlation signal output from the signal processor 60 at a point C in FIG. 1.

Also, when a spread signal which has been spread in spectrum with a code different from the spreading code X is input, in correlation signals which are output respectively corresponding to divided codes $C_1$–$C_{16}$, peaks appear respectively at different positions or a peak does not appear. Thus, after these correlation signals are stored in the memory 50 as digital data, even if these digital data are summed, all peaks are never summed overlapped one another, and in a summed result, a peak as shown in FIG. 3(c) never appears.

Furthermore, when comparing the case wherein the spread spectrum signal processing apparatus according to the present invention is applied, with the prior art case wherein a correlator having an interaction length corresponding to a length of the spreading code X is used without applying the spread spectrum signal processing apparatus according to the present invention, the correlation signals which are output respectively are shown in FIG. 4. FIG. 4(a) is a time chart of correlation signals output from the signal processor 60 in the case wherein the spread spectrum signal processing apparatus according to the present invention is applied, and FIG. 4(b) is a time chart of correlation signals output from a correlator in the case of the prior art.

From FIGS. 4(a) and 4(b), it will be seen that in either case, substantially the same peaks appear in the correlation signal.

As mentioned above, in the embodiment of the present invention, there are comprised the correlator 10 for correlating the spread spectrum signal with the given reference signal, the A/D converter 40 for digitally converting the correlation signal, the memory 50 for storing the digital signal from the A/D converter 40 as the digital data, the signal processor 60 for summing the digital data respectively corresponding to divided codes $C_1$–$C_{16}$ and for outputting the summed result, and the control unit 70 for controlling the reference signal generator 20 so that the divided codes $C_1$–$C_{16}$ are applied in this order repeatedly to the correlator 10. The signal processor 60 is designed such that when the control unit 70 performs the control to apply the divided code $C_1$ again after performing the control to apply the divided code $C_{16}$, the signal processor 60 begins the summing process of the digital data by making reference to the timing signal output by the control unit 70.

As a result, in the correlator 10, it is possible to perform the correlation process by using the divided codes $C_1$–$C_{16}$ each having the length smaller than the spreading code X, and there is no need for the correlator 10 to use the one having an interaction length corresponding to the length (256 bits) of the spreading code X, and it is possible to use the correlator 10 having an interaction length corresponding to the length (16 bits) of each of the divided codes $C_1$–$C_{16}$. Therefore, in the spread spectrum communication which uses a long spreading code, as compared with the prior art, it is possible to perform the synchronization recognition of the spread spectrum signal, by using a correlator 10 having a size mountable on a portable equipment.

In comparison, in a correlator 10 constituted with a surface acoustic wave matched filter or a digital matched filter, the despreading code is fixed, and different despreading codes cannot be used in a single correlator. If it is intended to use the despreading code by dividing it as in the present invention, and because the divided codes are respectively different, a plurality of correlators corresponding in number to the number of divisions are required. In contrast, in the present embodiment, the correlator 10 is constituted with a surface acoustic wave convolver. By virtue of this, only one correlator 10, which is designed to use the despreading code by dividing it, is required, and in addition since the consumption of electric power is smaller in an analog correlator than a digital correlator, it is possible to achieve a smaller scale of the circuitry, and the reduction of electric power consumption can be attained.

Moreover, in the present embodiment, each of the divided codes $C_1$–$C_{16}$ is made to have the same length.

By virtue of this, in the case where the spreading code X is divided by the same number of division, for the correlator 10, a correlator having a minimum interaction length can be used.

Figure 5:
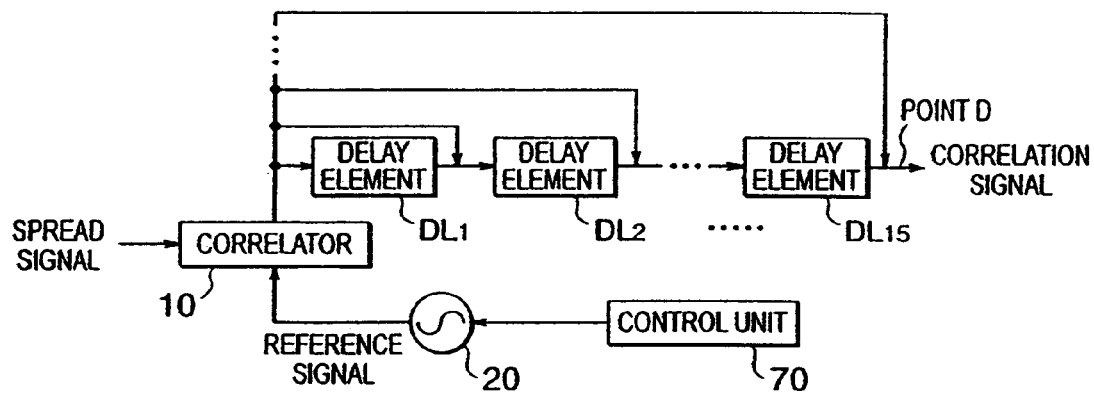
FIGS. 5(a) and 5(b) each show a block diagram of a second circuit construction of a spread spectrum signal processing according to the present invention.
Figure 5:
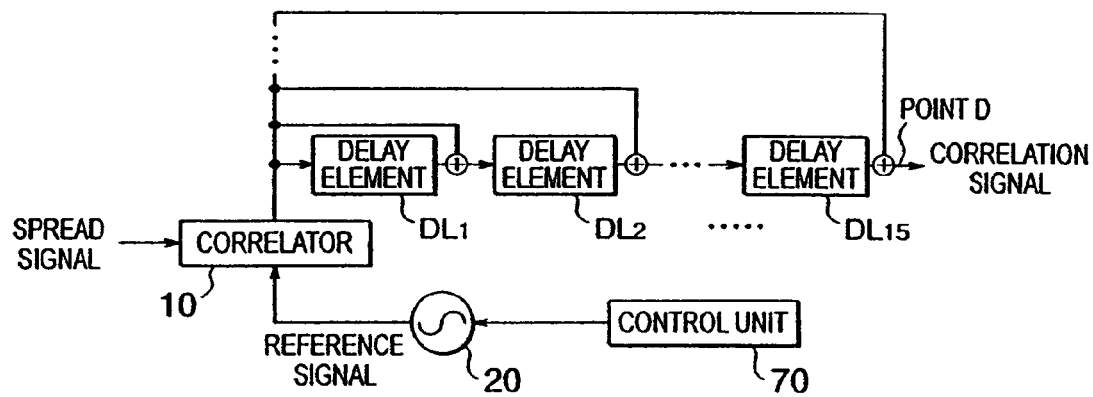
Figure 6:
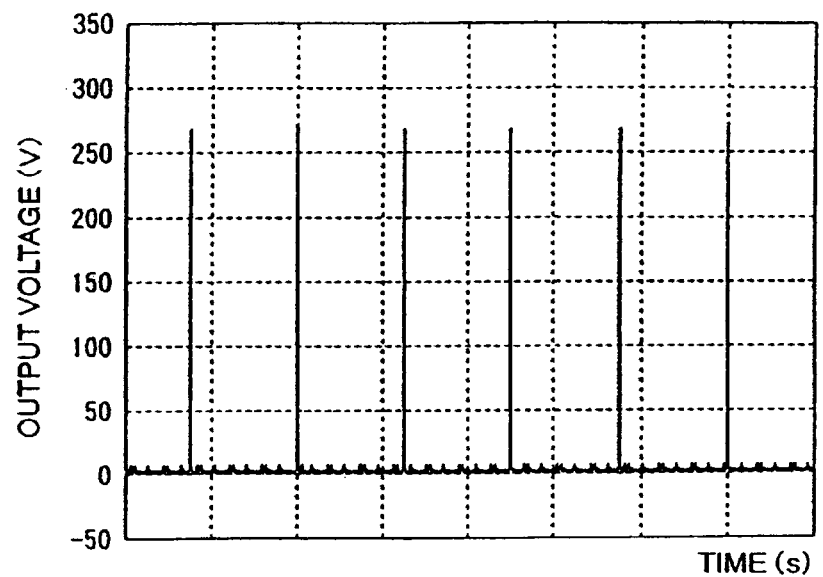
FIG. 6 shows a time chart of correlation signals which are output from the delay element DL15 at a point D in FIG. 5.

Next, a second embodiment of the spread spectrum signal processing apparatus will be described with reference to the drawings. FIGS. 5 and 6 are diagrams showing the second embodiment of the spread spectrum signal processing apparatus according to the present invention.

In the second embodiment, the spread spectrum signal processing apparatus according to the present invention is applied to the case where the synchronization recognition of the spread spectrum signal is performed by an analog processing in the spread spectrum communication using a spreading code of 256 bits as in the next generation mobile communication system such as the IMT-2000 or the like. In this respect, as the spreading code, for example, according to the IMT-2000, a Gold code of 256 bits is used.

First, the spread spectrum signal processing apparatus according to the present invention will be described with reference to FIG. 5. FIG. 5 is a block diagram showing a second circuit construction of the spread spectrum signal processing apparatus according to the present invention. The identical parts with those of the first embodiment are assigned with identical reference numerals and explanations thereof are omitted.

The spread spectrum signal processing apparatus according to the present invention, as shown in FIG. 5, comprises a correlator 10, a reference signal generator 20, a control unit 70, and a plurality of cascade-connected delay elements $DL_1$–$DL_{15}$.

The delay element $DL_1$ receives a correlation signal as an input signal from the correlator 10, and delays the input signal by a time duration (for example, 4 µs) corresponding to a length of each of the divided codes $C_1$–$C_{16}$. Each of the delay elements $DL_2$–$DL_{15}$ receives a sum of a delayed signal from each of the preceding delay element $DL_1$–$DL_{14}$ and the correlation signal from the correlator 10, and delays the input signal by the time duration corresponding to the length of each of the divided codes $C_1$–$C_{16}$. Furthermore, the output of the delay element $DL_{15}$ is connected to the output of the correlator 10, and a delayed signal from the delay element $DL_{15}$ and the correlation signal from the correlator 10 are summed.

Next, the operation of the second embodiment will be described.

First, as a result of the control of the reference signal generator 20 by the control unit 70, when each of the divided codes $C_1$–$C_{16}$ is applied to the correlator 10 as a reference signal from the reference signal generator 20, a correlation signal is output from the correlator 10 corresponding to each of the divided codes $C_1$–$C_{16}$.

When the correlation signal is sequentially output, the correlation signal which is output corresponding to each of the divided codes $C_1$–$C_{16}$, is delayed by the delay element $DL_1$ by a time duration corresponding to the length of each of the divided codes $C_1$–$C_{16}$. As a result, at the output of the delay element $DL_1$, the correlation signal corresponding to the divided code $C_1$ and delayed by the delay element $DL_1$, is summed with the correlation signal which is output corresponding to the divided code $C_2$, and the summed signal is supplied to the delay element $DL_2$. Subsequently, at the output terminal of the delay element $DL_2$, the correlation signals corresponding to the divided codes $C_1$ and $C_2$ and delayed by the delay element $DL_2$ is summed with the correlation signal which is output corresponding to the divided code $C_3$, and then supplied to the delay element $DL_3$.

In the same manner, at the output terminal of each of the delay elements $DL_3$–$DL_{14}$, the correlation signal corresponding to each of the divided codes $C_1$–$C_{14}$ delayed by each of the delay elements $DL_3$–$DL_{14}$, and the correlation signal which is output in correspondence with the divided code $C_3$–$C_{15}$ are summed and supplied to the next stage delay element $DL_4$–$DL_{15}$. At the output of the last stage delay element $DL_{15}$, the correction signals respectively corresponding to divided codes $C_1$–$C_{15}$ delayed by the delay element $DL_{15}$, and the correlation signal which is output corresponding to the divided code $C_{16}$ are summed and output.

Since the processing of the correlation signal is performed as mentioned above, when a spread spectrum signal by the same code as the spreading code X is input, at the delay element $DL_{15}$, the correlation signals which are output corresponding to divided codes $C_1$–$C_{16}$ are as shown in FIG. 6. FIG. 6 is a time chart showing the correlation signals which are output from the delay element $DL_{15}$ at a point D in FIG. 5, and the correlation signals are taken at one stationary point when the spread signal is input continuously.

Specifically, when the divided code $C_1$ is supplied to the correlator 10 as a reference signal, when a portion corresponding to the divided code $C_1$ in the spread spectrum signal by the same code as the spreading code X is input, a peak appears at a prescribed position in the correlation signal indicating the coincidence. In the same manner, when the divided codes $C_2$–$C_{16}$ are supplied to the correlator 10 as reference signals, when portions corresponding to the divided code $C_2$–$C_{16}$ in the spread spectrum signal by the same code as the spreading code X are input, peaks appear in the correlation signals at the same positions as the case in the divided code $C_1$ indicating the coincidence.

As a result, when these correlation signals are respectively delayed and summed, since the peak appears at the same position in each of the correlation signals, all the peaks are summed overlapped, and the summed result appears as a peak of a further high level.

Furthermore, when a spread spectrum signal by a code different from the spreading code X is input, in the correlation signals which are output corresponding respectively to divided codes $C_1$–$C_{16}$ at the delay element $DL_{15}$, the peaks appear respectively at different positions, or no peak appears. As a result, even when the correlation signals are respectively delayed and summed, all the peaks are never summed overlapped, and thus in the summed result, the peaks as shown in FIG. 6 never appear.

As mentioned above, in the present embodiment, there are provided with a plurality of delay elements $DL_1$–$DL_{15}$ for delaying a signal by a time corresponding to the length of each of the divided codes $C_1$–$C_{16}$, and the delay elements $DL_1$–$DL_{15}$ are connected in cascade, and the output of the correlator 10 is connected to the input of each of the delay elements $DL_1$–$DL_{15}$ and to the output of the last stage delay element $DL_{15}$.

By virtue of this arrangement, in the correlator 10, since it is possible to perform the correlation processing by using the divided codes $C_1$–$C_{16}$ each having a length shorter than the spreading code X, as the correlator 10, there is no need to use the one having an interaction length corresponding to the length (256 bits) of the spreading code X, and the one having an interaction length corresponding to the length (16 bits) of each of the divided codes $C_1$–$C_{16}$ can be used. Accordingly, in the spread spectrum communication using a long spreading code, as compared with the prior art, it is possible to perform the synchronization recognition of the spread spectrum signal by using a correlator 10 having a size mountable on a portable equipment.

Figure 7:
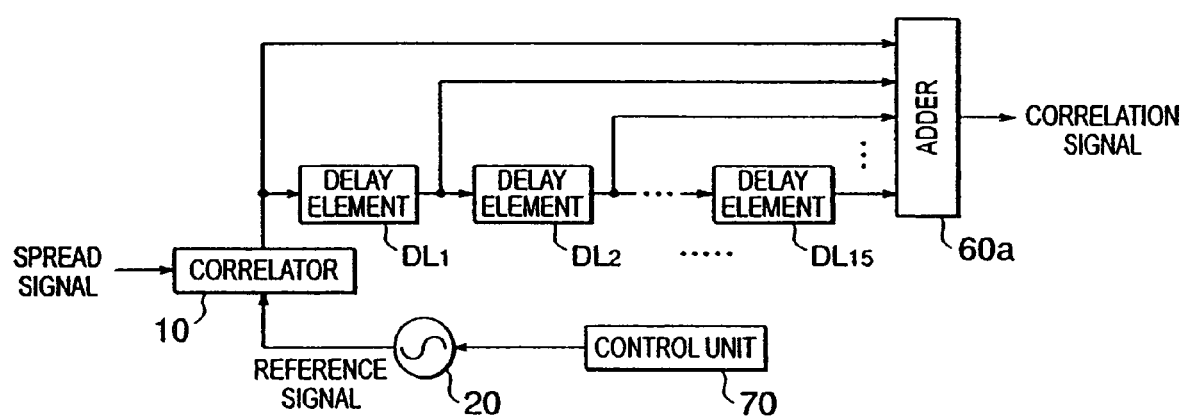
FIG. 7 shows a block diagram of a third circuit construction of a spread spectrum signal processing according to the present invention.

Next, a third embodiment of a spread spectrum processing apparatus according to the present invention will be described with reference to the drawings. FIG. 7 is a diagram showing the third embodiment of the spread spectrum processing apparatus according to the present invention.

In the third embodiment, the spread spectrum processing apparatus according to the present invention is applied to a case where the synchronization recognition of the spread spectrum signal is performed by an analog processing different from the second embodiment, in the spread spectrum communication using the spreading code of 256 bits as in the next generation mobile communication system such as IMT-2000 or the like. In this respect, as the spreading code, for example, according to the IMT-2000, a Gold code of 256 bits is used.

First, the arrangement of the spread spectrum processing apparatus according to the present invention will be described with reference to FIG. 7. FIG. 7 is a block diagram showing a third circuit arrangement of the spread spectrum processing apparatus according to the present invention. Hereinafter, identical parts with those in the first and the second embodiment are assigned with identical reference numerals and detailed explanation is omitted.

The spread spectrum processing apparatus according to the present invention, as shown in FIG. 7, comprises a correlator 10, a reference signal generator 20, a plurality of cascade-connected delay elements $DL_1$–$DL_{15}$, and an adder 60a for summing delayed signals from respective delay elements $DL_1$–$DL_{15}$ and a correlation signal from the correlator 10.

The delay element $DL_1$ is designed to receive a correlation signal as an input signal from the correlator 10, and delays the input signal by a time duration corresponding to a length of each of the divided codes $C_1$–$C_{16}$. Each of the delay elements $DL_2$–$DL_{15}$ receives a delayed signal as an input signal from a preceding stage delay element $DL_1$–$DL_{14}$, and delays the input signal by a time duration corresponding to a length of each of the divided codes $C_1$–$C_{16}$.

Next, the operation of the third embodiment will be described.

First, as a result of the control of the reference signal generator 20 by the control unit 70, when each of the divided codes $C_1$–$C_{16}$ is supplied to the correlator 10 as a reference signal, a correlation signal is output by the correlator 10 corresponding to each of the divided codes $C_1$–$C_{16}$.

When the correlation signals are sequentially output, at the adder 60a, a correlation signal generated corresponding to the divided code $C_1$ and delayed by the delay elements $DL_1$–$DL_{15}$, a correlation signal generated corresponding to the divided code $C_2$ and delayed by the delay elements $DL_1$–$DL_{14}$, and in the same manner, correlation signals respectively generated corresponding to the divided codes $C_3$–$C_{15}$ and delayed by the delay elements $DL_1$–$DL_{13}$, and a correlation signal from the correlator 10 (which is output corresponding to the divided code $C_{16}$) are summed, and the summed signal is output.

Since the processing of the correlation signals is performed as mentioned above, when a spread spectrum signal by the same code as the spreading code X is input, at the adder 60a, the correlation signals which are output corresponding to the respective divided codes $C_1$–$C_{16}$ are similar to those shown in FIG. 6.

Specifically, when the divided code $C_1$ is supplied to the correlator 10 as a reference signal, when a portion of the spread signal corresponding to the divided code $C_1$, which spread signal being spread in spectrum by the same code as the spreading code X, is input, a peak appears in the correlation signal at a prescribed position indicating the coincidence. In the same manner, when the divided codes $C_2$–$C_{16}$ are supplied to the correlator 10 as reference signals, when portions of the spread signal corresponding respectively to the divided codes $C_2$–$C_{16}$, which spread signal being spread in spectrum by the same code as the spreading code X, are input, peaks appear in the correlation signals respectively at the same position as in the case of the divided code $C_1$ indicating the coincidence.

Accordingly, when these correlation signals are respectively delayed and summed, in each correlation signal, since a peak appears in any correlation signal at the same position, all the peaks are summed overlapped, and in the summed result, a peak having a further high level appears.

Furthermore, when a spread spectrum signal by a code different from the spreading code X, at the adder 60a, in correlation signals which are output respectively corresponding to the divided codes $C_1$–$C_{16}$, peaks appear respectively at different positions, or no peak appears. Therefore, even when these correlation signals are delayed and summed, all the peaks are never summed overlapped, and in the summed result, the peak as shown in FIG. 6 never appears.

As described above, in the present embodiment, there are comprised a plurality of delay elements $DL_1$–$DL_{15}$ for delaying a signal by a time duration corresponding to the length of each of the divided codes $C_1$–$C_{16}$, and an adder 60a for summing the delayed signals from the delay elements $DL_1$–$DL_{15}$ and the correlation signal from the correlator 10, and the delay elements $DL_1$–$DL_{15}$ are connected in cascade, and at the same time, the output terminal of the correlator 10 is connected to the input terminal of the first stage delay element $DL_1$.

By virtue of this, at the correlator 10, since it is possible to perform the correlation processing by using the divided codes $C_1$–$C_{16}$ having the length shorter than the spreading code X, as the correlator 10, there is no need to use the one having an interaction length corresponding to the length (256 bits) of the spreading code X, and instead, the one having an interaction length corresponding to the length (16 bits) of each of the divided codes $C_1$–$C_{16}$ can be used. Accordingly, in the spread spectrum communication using a long spreading code, as compared with the prior art, it is possible to perform the synchronization recognition of the spread spectrum signal, by using a correlator 10 having a size mountable on a portable equipment.

In the first, second, and third embodiments, the spread spectrum signal processing apparatus according to the present invention is applied to the case where the synchronization recognition of the spread spectrum signal is performed by digital or analog processing in the spread spectrum communication using the spreading code of 256 bits. However, the present invention is not limited to this but the present invention may be applied to the case where the despreading of the spread spectrum signal is performed by digital or analog processing. Specifically, in a communication apparatus which comprises a synchronization detecting device for performing the synchronization recognition of the spread signal, and a despreading circuit for performing the despreading by making reference to a synchronization recognition signal from the synchronization detecting device, and which performs communication by the spread spectrum signal spread, the spread spectrum signal processing apparatus according to the present invention is applied to the despreading circuit. Even applying to such a case, the effect equivalent to the above-mentioned first, second and third embodiments can be obtained.

In the first, second, and third embodiments, the correlator 10 is constituted by a surface acoustic wave convolver, however, the present invention is not limited to this, but the correlator 10 may be constituted by a surface acoustic wave matched filter, a digital matched filter, or the like. In such a constitution, it is possible to perform the synchronization recognition of the spread spectrum signal, by using s surface acoustic wave matched filter, a digital matched filter, or the like having a smaller size as compared with the prior art.

Furthermore, in the first, second, and third embodiments, the length of each of the divided codes $C_1$–$C_{16}$ is constituted by 16 bits, however, in order to ensure a sufficient S/N ratio of the output signal of the surface acoustic wave convolver, it is preferable that the length of each of the divided codes $C_1$–$C_{16}$ is constituted by 10 bits or larger, or further, by 30 bits or larger.

Furthermore, in the first embodiment, the sampling rate of the A/D converter 40 is not specifically described, however, the sampling rate of the A/D converter 40 is required to be higher than the chip rate of the correlator 10, and in particular, in order to ensure a sufficient S/N ratio of the output signal of the signal processor 60, it is preferable that the sampling rate of the A/D converter 40 is 4 times or more as large as the chip rate of the correlator 10.

Furthermore, in the first embodiment, the signal processor 60 is designed to start the summing processing of the digital data within the memory 50 corresponding to each of the divided codes $C_1$–$C_{16}$ upon receiving the timing signal from the control unit 70, and then outputs the summed result, however, the present invention is not limited to this, and it may be arranged to provide a window for allowing the computation processing only for signals within a limited time region.

Furthermore, in the second and third embodiments, the detailed arrangement of each of the delay elements $DL_1$–$DL_{15}$ is not described, however, each of the delay elements $DL_1$–$DL_{15}$ may be arranged, for example, by a surface acoustic delay line, a tapped delay line, or the like. In particular, when each of the delay elements $DL_1$–$DL_{15}$ is arranged by the surface acoustic wave delay line, since it is possible to form on the same substrate as the one mounting a correlator 10 made up of a surface acoustic wave convolver, or a surface acoustic wave matched filter, the scale of the whole circuitry can be made small and preferable. Moreover, since the surface acoustic wave delay line, the surface acoustic wave convolver, and the surface acoustic wave matched filter are all passive elements which do not consume electric power, it is possible to realize a circuitry with low electric power consumption.

Next, a fourth embodiment of the spread spectrum signal processing apparatus according to the present invention will be explained with respect to the drawings, FIGS. 8 to 12.

In this fourth embodiment, the spread spectrum signal processing apparatus according to the present invention is applied to a receiver in a spread spectrum communication in which the spreading code of 256 bits is used as in the next generation mobile communication system such as IMT-2000 or the like, and code multiplexing is performed. More specifically, the synchronization recognition and the despreading of the spread spectrum signal are applied to the case wherein a correlator smaller than the interaction length corresponding to the length of the spreading code is used. In this respect, as the spreading code, for example, according to IMT-2000, the Gold code of 256 bits is used.

In the first to third embodiments, the despreading code is divided into a plurality of codes in advance, and each divided code is made to generate in succession as a reference signal in accordance with the arrangement order in the despreading code. However, in such a structure, it is possible to perform the synchronization recognition and the despreading without any problem in the case wherein a phase difference between the spread signal and the reference signal is less than the divided code length, however, when the phase difference is larger than that, it becomes impossible to perform the synchronization recognition and the despreading. In order to solve this problem, in the fourth embodiment, some of the divided codes is made to generate in succession as a reference signal, and after detecting the initial synchronization, each divided code is made to generate in succession in accordance with the arrangement order in the despreading code.

First, the construction of the spread signal which is the object of processing in this embodiment will be explained with reference to FIG. 8.

Figure 8:
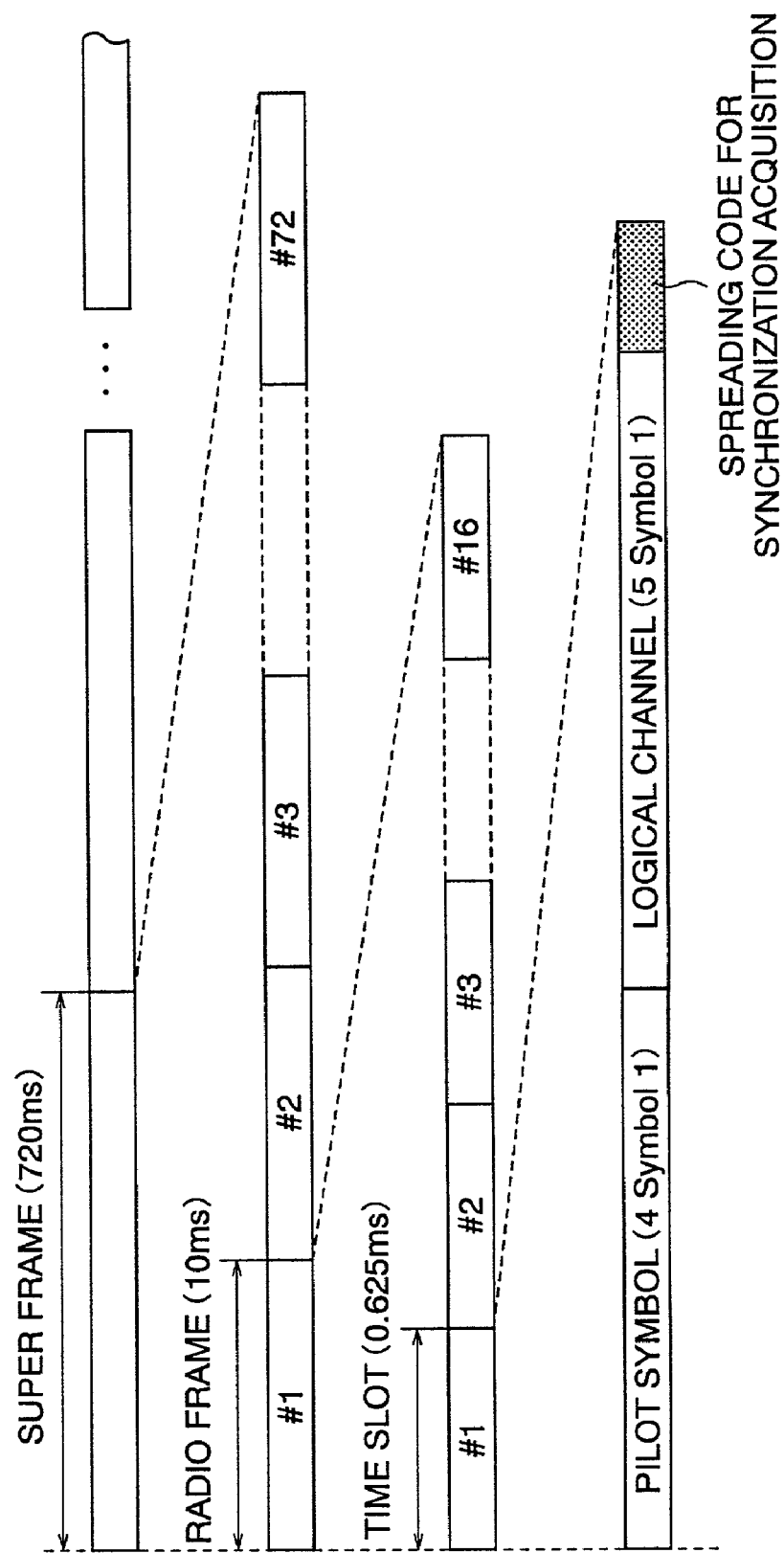
FIG. 8 is a diagram showing a structure of a spread signal.

The spread signal, as shown in FIG. 8, is comprised of a plurality of superframes, and each superframe has a frame period of 720 ms, and further includes 72 radio frames. Each radio frame has a frame period of 10 ms, and includes 16 time slots. Each time slot has a slot period of 0.625 ms, and includes a pilot symbol, a logical channel, and a spreading code for synchronization acquisition. The pilot symbol, the logical channel, and the spread code for synchronization acquisition respectively include 4 symbols, 5 symbols, and 1 symbol, wherein 1 symbol has 256 bits.

The spread spectrum signal processing apparatus according to the present invention is designed to perform the acquisition of synchronization with the spread signal by using a despreading code for despreading the spreading code for the above-mentioned synchronization acquisition (hereinafter, referred to as merely a spreading code). In the following description, the abbreviation "TPN" second means a period of the spreading code, and "TC" second means a period per 1 bit of the spreading code, and here, there is a relation that a spreading code length×TC=TPN.

Next, a structure of a spread spectrum signal processing apparatus according to the present invention will be explained with reference to FIG. 9 which is a block diagram showing a circuit arrangement of an embodiment of the spread spectrum signal processing apparatus.

Figure 9:
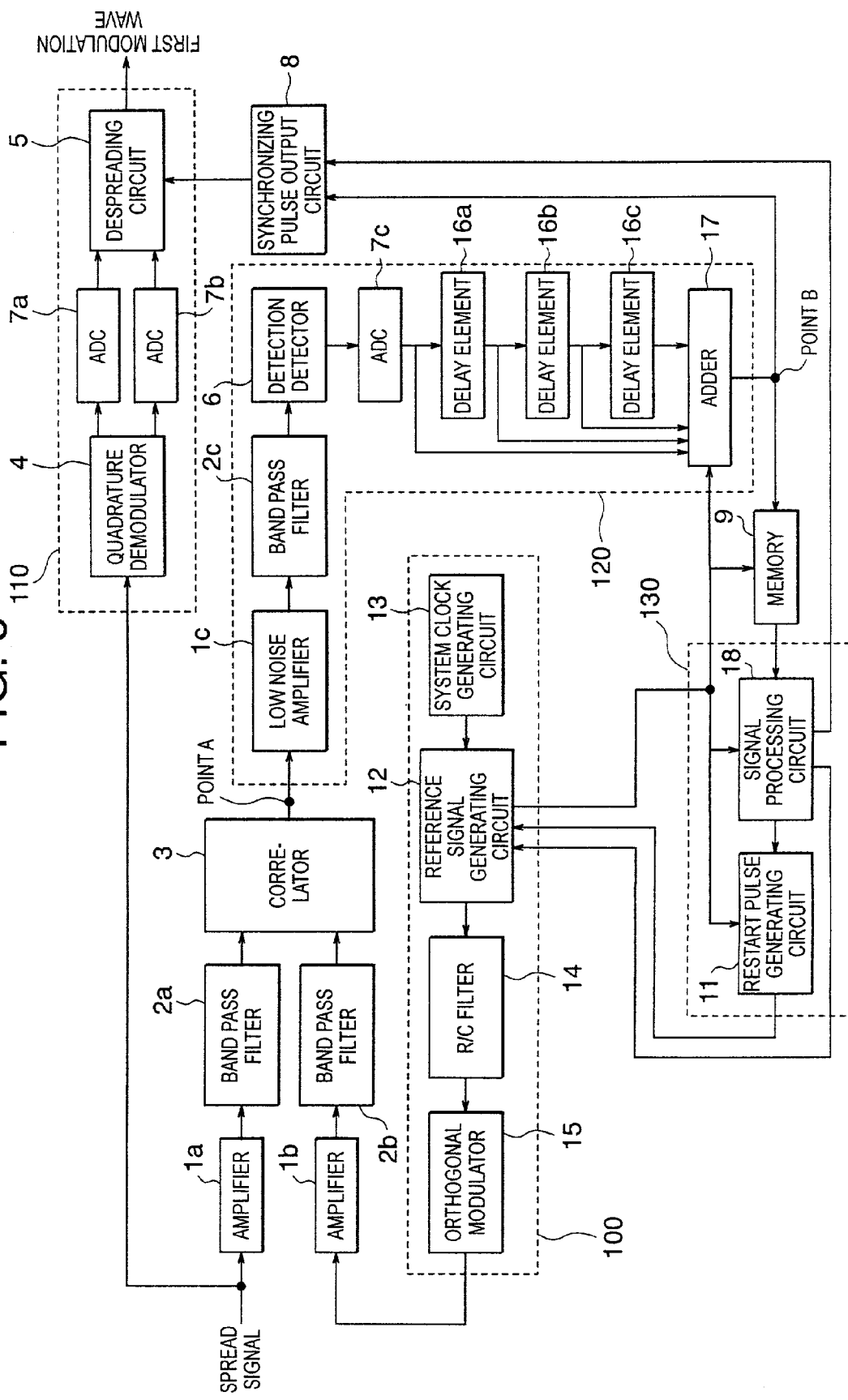
FIG. 9 is a block diagram showing a circuit construction of an embodiment of a spread spectrum signal processing apparatus according to the present invention.

The spread spectrum signal processing apparatus comprises as shown in FIG. 9, a correlator 3 for correlating a spread signal with a reference signal, a reference signal generating portion 100 for generating a reference signal and supplying to the correlator 3, a despreading portion 110 for despreading the spread signal supplied thereto, a converting portion 120 for detecting the correlation signal from the correlator 3 and for converting into a digital signal, a memory 9 for storing the digital signal from the converting portion 120 as digital data, a signal processing portion 130 for detecting a phase difference between the spread signal and the reference signal by making reference to the digital data of the memory 9 and for determining a generating timing of the reference signal, amplifiers 1*a* and 1*b*, band-pass filters 2*a* and 2*b*, and a synchronizing pulse output circuit 8.

The correlator 3 is a surface acoustic wave convolver designed at an operating frequency $f_0$, and has an interaction length corresponding to ¼ (64 bits) of a length of the spreading code. One input of the correlator 3 receives the spread signal through the amplifier 1*a* and the band-pass filter 2*a*, and the other input receives the reference signal from the reference signal generating portion 100 through the amplifier 1*b* and the band-pass filter 2*b*, and a convolution signal (hereinafter, referred to as a correlation signal) of both the input signals is output. In this respect, since the chip rate is 4.096 Mcps and the length of the spreading code is 64 bits, and supposing that the surface acoustic wave velocity is 4000 m/s, the interaction length L will be 64 mm from the above-mentioned equation (1).

The amplifiers 1*a* and 1*b* are high frequency amplifiers which amplify the input signals to the correlator 3 to a signal intensity sufficient to operate the correlator 3. They have a function to uniformly amplify a signal within a frequency range of $f_0 \pm (1/TC)$. Also, the band-pass filters 2*a* and 2*b* are filters for attenuating undesired signals such as spurious signal outside the frequency range of $f_0\pm(1/TC)$.

The reference signal generating portion 100 includes a system clock generating circuit 13 for successively generating a clock pulse having a frequency corresponding to 4 times or more as large as the chip rate of the correlator 3, a reference signal generating circuit 12 operated by the clock pulse from the system clock generating circuit 13 and generating a reference signal, an R/C filter 14 which is a root Nyquist filter for performing band compression, and an orthogonal modulator 15.

In the reference signal generating circuit 12, a despreading code which is formed by time inverting a code identical with the spreading code is divided beforehand into a plurality of codes $C_1$–$C_4$ each having a ¼ length of the despreading code, so that the length of each code corresponds to the length of the interaction length of the correlator 3, and the divided code $C_1$ is generated successively as a reference signal, and when a reference change-over pulse (which will be described later) is input from a signal processing circuit 18 described later, each of the divided codes $C_1$–$C_4$ is generated in succession as a reference signal in accordance with the arrangement order in the despreading code, and these generated reference signals are supplied to the amplifier 1b through the R/C filter 14 and the orthogonal modulator 15. Furthermore, at the timing of generating a leading bit of each of the divided codes $C_1$–$C_4$, a leading bit pulse is generated, and at the same time, when a restart pulse is received from a restart pulse generating circuit 11, an initial value of the code generation provided within the inside is cleared to zero, and at the input timing of the restart pulse, each of the divided codes $C_1$–$C_4$ is regenerated from the leading bit thereof.

The despreading portion 110 performs modulation of the type similar to the one which was used in spreading the spread signal, and includes an orthogonal demodulator 4 for converting the spread signal supplied thereto into an I/Q signal, an ADC 7a for converting the I signal from the orthogonal demodulator 4 into a digital signal, an ADC 7b for converting the Q signal from the orthogonal demodulator 4 into a digital signal, and a despreading circuit 5 for despreading the digital signals from the ADCs 7a and 7b.

The despreading circuit 5 has a function to produce a despreading code in the inside for despreading the spreading code, and performs despreading of the digital I signal from the ADC 7a and the digital Q signal from the ADC 7b by using the produced despreading code. This despreading is performed at the timing at which a synchronizing pulse is supplied from a synchronizing pulse output circuit 8.

The converting portion 120 includes a low noise amplifier 1c, a band-pass filter 2c for attenuating undesired signals such as a spurious signal or the like which are outside a frequency range of $2f_0\pm(1/TC)$, a detector 6 for detecting the correlation signal output from the correlator 3 through the low noise amplifier 1c and the band-pass filter 2c, an ADC 7c for converting the correlation signal detected by the detecting circuit 6 into a digital signal, three delay elements 16a–16c connected in cascade for delaying the digital signal from the ADC 7c, and an adder 17 for summing a delayed signal from each of the delay elements 16a–16c and the digital signal from the ADC 7c.

The detector 6 is designed to full-wave rectify the correlation signal from the correlator 3, and at the same time, to convert into a lower frequency band.

The delay element 16a receives the digital signal from the ADC 7c, and delays the digital signal by a time duration (for example, 16 micro sec) corresponding to the length of each of the divided codes $C_1$–$C_4$, and the delay elements 16b and 16c receive respectively a delayed signal from the preceding stage, and delays the received delayed signal by a time duration corresponding to the length of each of the divided codes $C_1$–$C_4$.

A memory 9 has two banks A and B respectively operable by different clocks for writing and reading, and the banks A and B can be changed over in response to a leading bit pulse. In these banks A and B, one bank serves as a storing bank for storing the digital signal from the ADC 7c as digital data, and the other bank serves as a reading bank for reading out the stored digital data by the signal processing portion 130. These banks A and B are alternately changed over to the storing bank and to the reading bank by inputting a leading bit pulse.

For example, now, supposing that the bank A is serving as the storing bank, and the bank B is serving as the reading bank, the bank A stores the digital signal from the ADC 7c as the digital data in sequence from a leading address. Next, upon receiving the leading bit pulse, the bank A becomes the reading bank, and the bank B becomes the storing bank. In this manner, when the banks are changed over, a store starting address and a read starting address are made to be the leading address, and the bank B stores the digital signal from the ADC 7c in sequence from the leading address, and the bank A becomes readable the digital data stored before the change-over in sequence from the leading address.

The signal processing portion 130 includes a signal processing circuit 18 for processing the digital data of the memory 9, and a restart pulse generating circuit 11 for generating a restart pulse at the time corresponding to the number of bits of deviation calculated by the signal processing circuit 18.

Figure 10:
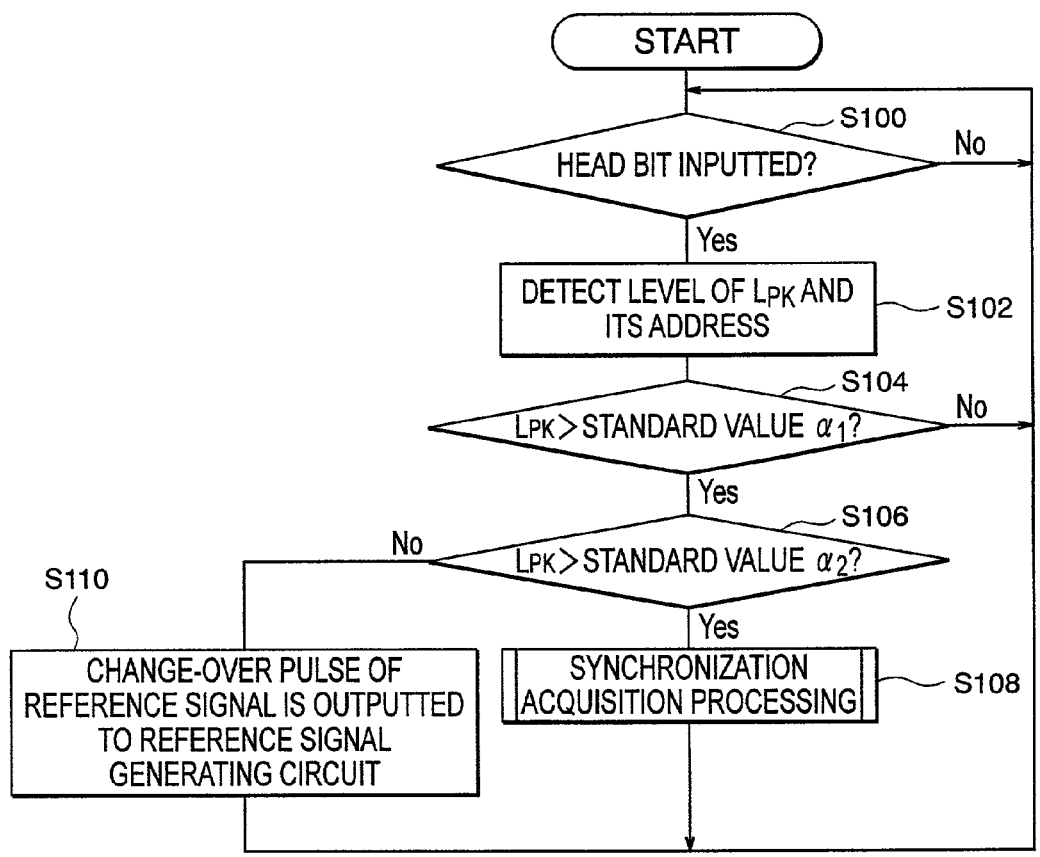
FIG. 10 is a flow chart showing a signal processing executed in the signal processing circuit 18.

The signal processing circuit 18 detects a maximum peak from the digital data of the memory 9 at the time when a leading bit pulse is input, and detects its level and an address value. The signal processing circuit 18 outputs a reference signal change-over pulse based on the detected maximum peak level, and calculates the number of bits of deviation between a spreading code contained in the spread signal and a despreading code contained in the reference signal, and specifically, a signal processing shown in a flowchart of FIG. 10 is implemented. FIG. 10 shows the flow chart of the signal processing executed by the signal processing circuit 18.

Upon execution of the signal processing in the signal processing circuit 18, as shown in FIG. 10, proceeds to step S100, and decides whether a leading bit pulse is input or not, and when it is decided that the leading bit pulse is input (Yes), proceeds to step S102, however, when it is decided it is not (No), the step S100 is repeated until the leading bit pulse is input.

In step S102, digital data is read from the read-out bank of the memory 9, and a maximum peak level $L_{PK}$ and an address value on the memory 9 at which the digital data is stored are detected from the read-out digital data, and proceeds to Step 104 in which it is decided whether the maximum peak level $L_{PK}$ exceeds a preset standard value $\alpha_1$ or not. This step S104 is a processing to determine whether the maximum peak level $L_{PK}$ is actually detected as a correlation peak or it is detected merely as a noise, and when the maximum peak level $L_{PK}$ exceeds the standard value, it is decided that the maximum peak level $L_{PK}$ is detected as the correlation peak.

As a result of the decision in step S104, when it is decided that the maximum peak level $L_{PK}$ exceeds the standard value $\alpha_1$ (Yes), proceeds to step S106, and it is decided whether the maximum peak level $L_{PK}$ exceeds a preset standard value $\alpha_2$ ($\alpha_2 > \alpha_1$). This step S106 is a processing to determine whether the maximum peak level $L_{PK}$ is detected as an overlapped correlation peak of respective correlation peaks of respective divided codes $C_1$–$C_4$, or the maximum peak level $L_{PK}$ is detected as any one of the correlation peaks respectively corresponding to the divided codes $C_1$–$C_4$. And when the maximum peak level $L_{PK}$ exceeds the standard value $\alpha_2$, it is decided that the maximum peak level $L_{PK}$ is detected as the overlapped correlation peaks of all the correlation peaks respectively corresponding to the divided codes $C_1$–$C_4$.

As a result of the decision in step S106, when it is decided that the maximum peak level $L_{PK}$ exceeds the standard value $\alpha_1$ (Yes), proceeds to step S108, and a synchronization acquisition processing is executed to perform synchronization acquisition, and then proceeds to step S100. The synchronization acquisition processing in step S108, for example, is as follows.

The number of bits of deviation between the spreading code and the despreading code is calculated on the basis of the address value of the detected maximum peak. Then it is decided whether the calculated number of bits is equal to "0" or not, and when it is decided that the number of bits of deviation is "0" (Yes), a coincidence pulse indicating that the phase of the spreading signal coincides with that of the reference signal is output to the synchronization pulse output circuit 8, and the calculated number of bits of deviation is output to the restart pulse generating circuit 11. On the other hand, when it is decided that the calculated number of bits of deviation is not "0" (No), the calculated number of bits of deviation is output to the restart pulse generating circuit 11.

On the other hand, in the step S106, when it is decided that the maximum peak level $L_{PK}$ does not exceed (No) the standard value $\alpha_2$, proceeds to step 110, and the reference signal change-over pulse is output to the reference signal generating circuit 12, and goes to step S100.

On the other hand, in the step S104, when it is decided that the maximum peak level $L_{PK}$ does not exceed (No) the standard value $\alpha_1$, proceeds to step 100.

Figure 11:
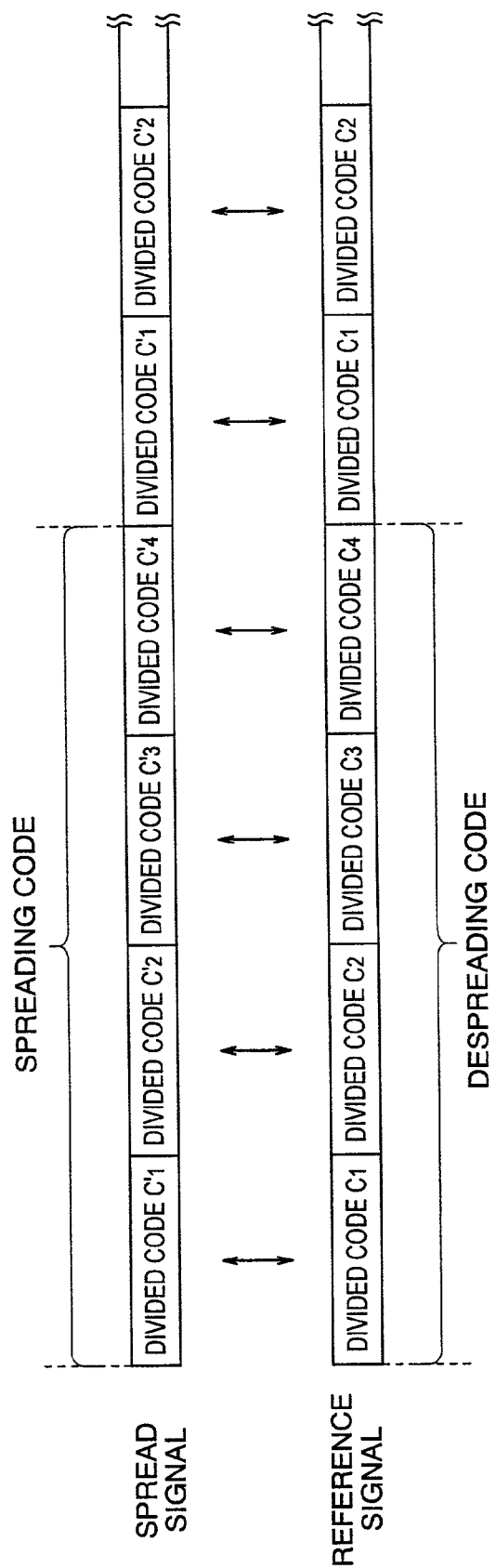
FIG. 11 is a diagram showing an example of a correlation processing in the correlator 3.
Figure 12:
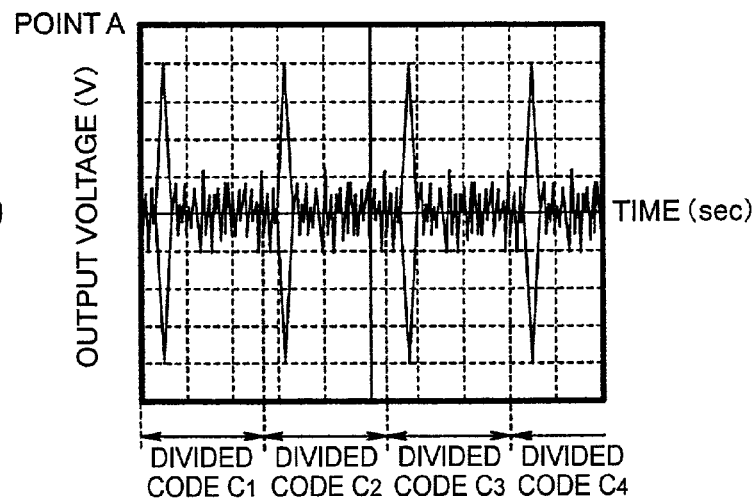
FIGS. 12(a) and 12(b) are time charts showing correlation signals at points A and B in FIG. 9, respectively.
Figure 12:
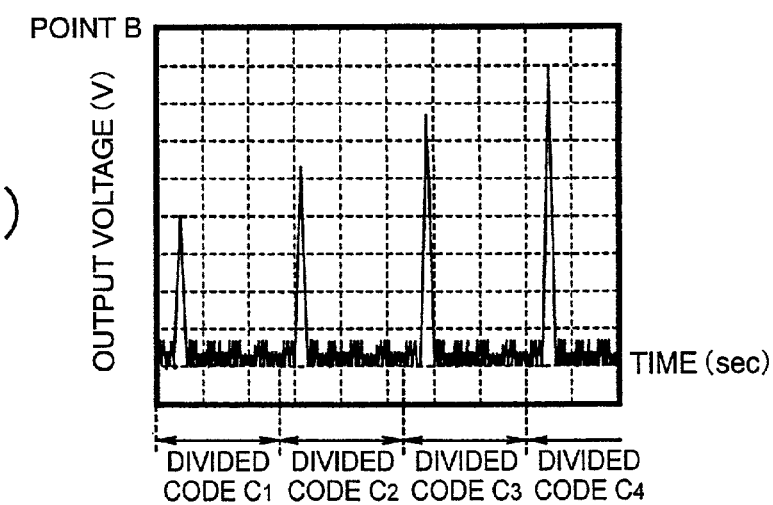

Next, the fourth embodiment mentioned above will be explained with reference to FIGS. 11 and 12. FIG. 11 shows an example of the correlation processing in the correlator 3, and FIG. 12 is a time chart showing the correlation signal at points A and B in FIG. 9.

First, in the reference signal generating circuit 12, when the clock pulse is input from the system clock generating circuit 13, in synchronism with this, the divided code $C_1$ is generated as the reference signal, and the generated reference signal is output to the correlator 3 through the R/C filter 14, orthogonal modulator 15, amplifier 1b, and band-pass filter 2b.

On the other hand, when a spread signal is received by an antenna not shown, the received spread signal is converted by a frequency converter such as a mixer into a signal having an operating frequency $f_0$ of the correlator 3, and then supplied to the correlator 3 through the amplifier 1a, and band-pass filter 2a.

For example, as shown in FIG. 11, supposing that the spreading code consists of a plurality of divided codes $C'_1$–$C'_4$ each having a length of ¼ of the spreading code, and in this case, when a phase difference between a portion of the spread signal corresponding to the divided code $C'_1$ and the reference signal is not less than one code period, the correlation between the reference signal and the spread signal is determined in the correlator 3, however, since these signals do not coincide with each other in a range of the interaction length, a correlation signal including a high level peak is not generated.

However, when the spread signal including the spreading code is input to the correlator 3, and further when the phase difference between the portion of the spread signal corresponding to the divided code $C'_1$ and the reference signal is not greater than one code period, in the correlator 3, the correlation between the spread signal including the divided code $C'_1$ and the reference signal is determined, and as a result, a correlation signal including a high level peak is generated. When such a correlation signal from the correlator 3 is detected in the detector 6, the detected correlation signal is converted into a digital signal by the ADC 7c, and then stored in the memory 9 through each of the delay elements 16a–16c.

On the other hand, when a leading bit pulse is input by the reference signal generating circuit 12, in the memory 9, for example, the digital signal from the adder 17 is stored from a leading address of the bank A in sequence as digital data. And when the next leading bit pulse is input from the reference signal generating circuit 12, in the memory 9, the bank A becomes the reading-out bank, and at the same time, the bank B becomes the storing bank. Thus, the digital data stored in the bank A of the memory 9 is read out in sequence from the leading address by the signal processing circuit 18.

In the signal processing circuit 18, the output peak from the read-out digital data is detected as the maximum peak level $L_{PK}$, and since the detected maximum peak level $L_{PK}$ is a correlation peak, it is greater than or equal to the standard value $\alpha_1$ and less than or equal to the standard value $\alpha_2$, the reference signal change-over signal is output to the reference signal generating circuit 12.

In the reference signal generating circuit 12, when the reference signal change-over signal is input, each of the divided codes $C_1$–$C_4$ is supplied in this sequence to the correlator 3 repeatedly as a reference signal. However, the generation of the reference signals begins with the divided code $C_2$.

On the other hand, after the spread signal including the divided code $C'_1$ is supplied to the correlator 3, as shown in FIG. 11, subsequently, since the spread signal including the divided codes $C'_2$–$C'_4$ which constitute the spreading code is input, in the correlator 3, first, the correlation between the spread signal including the divided codes $C'_2$ and the reference signal including the divided code $C_2$ is determined, and as a result, a correlation signal including a peak of a high level is output. In the same manner, the correlation between the spread signal including the divided codes $C'_3$, $C'_4$ and the reference signal including the divided codes $C_3$, $C_4$ is determined, and correlation signals including peaks of a high level as shown in FIG. 12(a) are sequentially output. When such correlation signals from the correlator 3 are detected by the detector 6, the detected correlation signals are converted into a digital signal by the ADC 7c and output to the memory 9 through each of the delay elements 16a–16c.

Thus, when the correlation signals are sequentially output, since each of the correlation signals output corresponding to each of the divided codes $C_1$–$C_4$ is delayed by the delay element 16a by a time period corresponding to a length of each of the divided codes $C_1$–$C_4$, at the adder 17, the correlation signal corresponding to the divided code $C_1$ and delayed by the delay element 16a is added to the correlation signal corresponding to the divided code $C_2$, and the added result is output. Subsequently, the correlation signals respectively corresponding to the divided codes $C_1$ and $C_2$ and delayed respectively by the delay elements 16a and 16b, and the correlation signal output corresponding to the divided codes $C_3$ are added, and the added result is output.

In the same manner, at the adder 17, the correlation signals respectively corresponding to the divided codes $C_1$–$C_4$ and delayed respectively by the delay elements 16a–16c, and the correlation signal which is output corresponding to the divided code $C_4$ are added, and the added result is output.

Since the processing of the correlation signals is performed as described above, when the spread signal including the spreading codes is input, the correlation signals which are output at the adder 17 respectively corresponding to the divided codes $C_1$–$C_4$ are shown in FIG. 12(b).

Specifically, when the divided code $C_1$ is input to the correlator 3 as the reference signal, if the spread signal including the portion of the divided code $C'_1$ of the spreading code is input, in the correlation signal, a peak of a high level appears at a time point at which the inputting of the spread signal including the divided code $C'_1$ has been finished. Similarly, when the divided codes $C_2$–$C_4$ are input to the correlator 3 as the reference signals, if the spread signal including the portions of the divided code $C'_2$–$C'_4$ of the spreading code are input, in the correlation signal, a peak of a high level appears at a time point the same as the case in the divided code $C_1$.

Accordingly, when the correlation signals are respectively delayed and summed, since each of the peaks appears at the same time point, all the peaks are summed overlapped, and a peak of further high level appears on the summed result.

On the other hand, in the memory 9, such digital signals from the adder 17 are stored as digital data sequentially from the leading address of the bank B. And, when the next leading bit pulse is input by the reference signal generating circuit 12, in the memory 9, the bank A becomes the storing bank and at the same time, the bank B becomes the reading-out bank, and the digital data stored in the bank B of the memory 9 is read out sequentially from the leading address by the signal processing circuit 18.

In the signal processing circuit 18, the output peak is detected as a maximum peak level $L_{PK}$, and since the detected maximum peak level $L_{PK}$ is formed by overlapping all the correlation peaks which are output respectively corresponding to the divided codes $C_1$–$C_4$, it becomes not less than the standard value $\alpha_2$, the synchronization acquisition processing is executed.

As mentioned above, in the present embodiment, there are provided with the correlator 3 corresponding to the length of the divided code, the reference signal generating portion 100, the converting portion 120, the memory 9, and the signal processing circuit 18, and the divided code $C_1$ is successively generated as a reference signal until the signal processing circuit 18 detects a peak level not less than the standard value $\alpha_2$, and after the signal processing circuit 18 detects the peak level not less than the standard value $\alpha_2$, each of the divided codes $C_1$–$C_4$ is successively generated as a reference signal in accordance with the arrangement order in the despreading code. However, the generation begins with the divided code $C_2$.

By virtue of this, in the case where the correlator 3 corresponding to the length of the divided code is used, even when the phase difference between the spread signal and the reference signal is longer than the length of the divided code, it is possible to acquire the spread signal relatively reliably. Thus, in the spread spectrum communication using the spreading code having a relatively long code length, it is possible to reduce the synchronization acquisition time required until the synchronization acquisition, and at the same time, the power consumption can be reduced. Still further, it is possible to perform the synchronization recognition and the despreading relatively accurately while achieving a small-sized circuit scale.

Furthermore, in the present embodiment, the converting portion 120 includes the low-noise amplifier 1c, the band-pass filter 2c, the detector 6, the ADC 7c, the three delay elements 16a–16c connected in cascade, and the adder 17 for summing the delayed signals from each of the delay elements 16a–16c and the digital signal from the ADC 7c, and in the delay element 16a, the digital signal from the ADC 7c is delayed by a time corresponding to the length of each of the divided codes $C_1$–$C_4$, and in the delay element 16b, 16c, the delayed signal from the previous stage 16a, 16b is delayed by a time corresponding to the length of each of the divided codes $C_1$–$C_4$.

By virtue of this, in the memory 9, since all the correlation peaks respectively output corresponding to the divided codes $C_1$–$C_4$ are stored overlapped, it is only necessary that the memory 9 has the capacity corresponding to the length of the divided code. Accordingly, as compared with the case where the despreading code is used as it is without dividing, the memory can be constituted with smaller capacity.

Furthermore, in the present embodiment, each of the divided codes $C_1$–$C_4$ is formed with the same length.

As a result, in the case where the despreading code is divided by the same dividing number, as the correlator 3, it is possible to use a correlator having a minimum length of interaction.

In the above-mentioned fourth embodiment, the spread spectrum signal processing apparatus according to the present invention is applied to the case where the synchronization recognition of the spread spectrum signal, and the despreading are performed by digital processing, however, the present invention is not limited to this, and it is possible to apply to the case where the synchronization recognition of the spread spectrum signal, and the despreading are performed by analog processing.

Furthermore, in the above-mentioned fourth embodiment, although it is constituted by using the memory of the bank type, the present invention is not limited to this, and it is possible to constitute by using a buffer of the ring type where a shift register for holding digital data corresponding to one code period of reference signal is provided, and the digital data is stored at the time of inputting a leading bit pulse, sequentially from the top of the shift register.

Furthermore, in the above-mentioned fourth embodiment, although the length of each of the divided codes $C_1$–$C_4$ is formed with 64 bits, in order to ensure a sufficient S/N ratio for the output signals of the correlator 3, it is preferable to form the length of each of the divided codes $C_1$–$C_4$ with equal to or larger than 10 bits, or further, with equal to or larger than 30 bits. Of course, the length of interaction of the correlator 3 is changed to match this length.

Furthermore, in the first, second, third, and fourth embodiments, as the spreading code, the Gold code of 256 its is used by dividing it. However, it is not limited to this, and as the spreading code, it may use a combination of a plurality of codes including the Gold code and the M system (hereinafter, referred to as Gold code, etc.) having a code length corresponding to the interaction length of the correlators 3 and 10. In the case of the latter, the maximum peak of a further high level higher than that of the former case is output. This is because that the self-correlation property of the Gold code, etc. is represented by only its code length. That is, in the former case, although the self-correlation property is provided as a whole, in an individual processing the self-correlation property is deteriorated.

Accordingly, in such a structure, since a further high level maximum peak is output when the phases of the spread signal and the reference signal are coincident with each other, it is possible to perform the synchronization recognition and the despreading more accurately.

Furthermore, in the above-mentioned fourth embodiment, in executing the signal processing of the flow chart in FIG. 10, it is explained as to the case where the signal processing circuit 18 executes directly, however, without being limited to this, the signal processing may be executed by forming the signal processing circuit 18 by connecting a CPU, a RAM, and a ROM by a bus, and by storing a program of these procedures in a storage medium, and by reading the program into the RAM from the storage medium.

Here, the storage medium includes semiconductor storage mediums such as a RAM, a ROM, etc. and storage mediums of a magnetic-storage type such as a FD, a HD, etc. and storage mediums of an optical readout type such as a CD, a CVD, an LD, and a DVD, etc. and magnetic storage type/optical readout type storage mediums such as a MO, etc. and thus, any type of storage mediums are included if they are readable by a computer, irrespective of their readout method such as an electronic, magnetic, optical, etc.

Next, an example of a spread spectrum signal processing apparatus according to the present invention will be explained with reference to FIGS. 13 and 14.

In this example, in the case of performing the spread spectrum communication by using the spreading code of 256 bits specified in IMT-2000, an upper limit of the dividing number of the despreading code is defined in the case where the despreading code is formed by time reversing a code identical with the spreading code, and the despreading code is used by dividing into a plurality of codes.

In the case where the despreading code is divided into n codes, supposing that the level of correlation peak which is output when the despreading code is used without dividing it is 1, the correlation peak which is output corresponding to each divided code has a 1/n level. For example, when the despreading code is used by dividing it into 8 divided codes, the correlation peak which is output corresponding to each divided code has a ⅛ level. As a result, as the number of the divided codes increases larger and larger, although it is possible to reduce the interaction length of the correlators 3 and 10, there is a problem that as its number is increased, the level of the correlation peak is reduced, and it is difficult to detect the initial synchronization.

Figure 13:
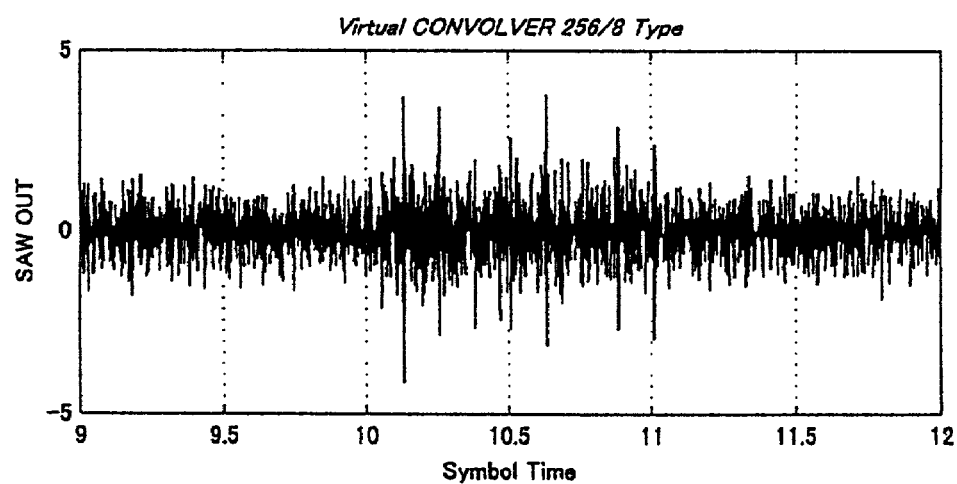
FIG. 13 is a time chart showing correlation signals which are output in the case where a despreading code of 256 (bits) is used by dividing it into 8.
Figure 14:
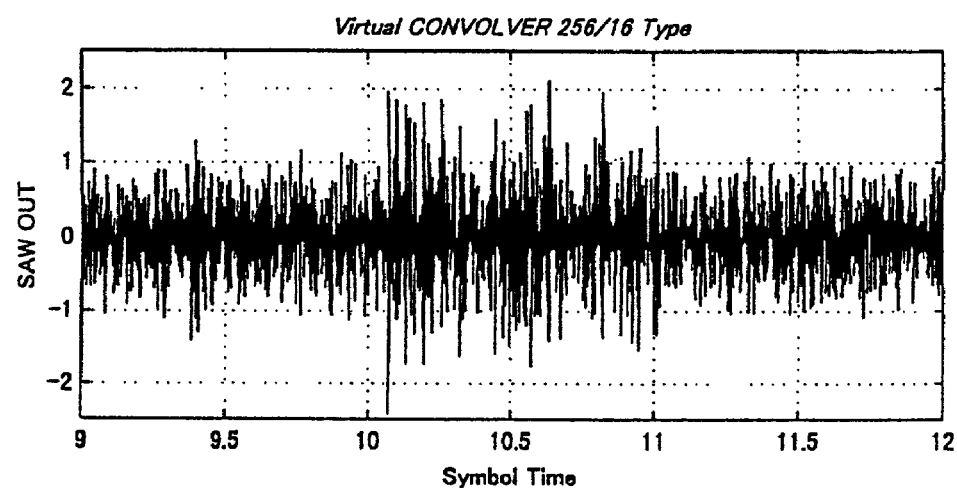
FIG. 14 is a time chart showing correlation signals which are output in the case where a despreading code of 256 (bits) is used by dividing it into 16.

The correlation signals which are output in the case where the despreading code of 256 bits is divided into 8 divided codes are shown in FIG. 13, and the correlation signals which are output in the case where the despreading code of 256 bits is divided into 16 divided codes are shown in FIG. 14. In the case of the former where it is divided into 8 divided codes, according to FIG. 13, the level of the correlation peak which is output corresponding to each divided code is reduced, however, since this level is somewhat larger than the noise level, it is seen that the detection of the correlation peak is possible to some extent. However, in the case of the latter where it is divided into 16 divided codes, according to FIG. 14, since the level of the correlation peak which is output corresponding to each divided code is reduced to the noise level, it is seen that the detection of the correlation peak is very difficult.

Accordingly, considering to trade off the small-sized circuit scale by reducing the interaction length of the correlators 3 and 10 for the accuracy of the synchronization recognition and the despreading, the upper limit of the dividing number of the despreading code is 8 when the despreading code of 256 bits specified by the IMT-2000 is used by dividing it.

INDUSTRIAL APPLICABILITY

As described in the foregoings, according to the spread spectrum signal processing apparatus of the present invention, as compared with the prior art, an advantageous effect is obtained in which in the spread spectrum communication using a long spreading code, the synchronization recognition of the spread spectrum signal and the despreading can be achieved by using a correlator of the size mountable on a portable equipment.

Furthermore, according to the spread spectrum signal processing apparatus of the present invention, in the case where the spreading code is divided by the same dividing number, an advantage is obtained in that a correlator having a minimum interaction length can be used.

Furthermore, according to the spread spectrum signal processing apparatus of the present invention, as compared with the case where the correlator is constituted by a surface acoustic wave matched filter or a digital matched filter, only one correlator is needed when it is desired to use the despreading code by dividing it, and yet, as compared with the case where it is constituted by the digital correlator, an advantage is obtained in that it is possible to achieve a small-sized circuit scale due to small power consumption, and at the same time to reduce the consumption of power.

Furthermore, according to the spread spectrum signal processing apparatus of the present invention, as compared with the prior art, in the spread spectrum communication using a relatively long code length as the spreading code, an advantage is obtained in that it is possible to reduce the synchronization acquisition time required until the synchronization acquisition, and at the same time, it is possible to reduce the power consumption, and it is possible to perform the synchronization recognition and the despreading relatively accurately while achieving a small-sized circuit scale.

On the other hand, according to the spread spectrum signal processing apparatus of the present invention, as the correlator which is used either in the synchronization recognition means or in the despreading means, there is no need to use a correlator having an interaction length corresponding to the spreading code, and a correlator having an interaction length corresponding to the divided code can be used.

The invention claimed is:

1. A spread spectrum signal processing apparatus for processing a correlation signal from a correlator, comprising:
   a correlator for correlating a spread spectrum signal with a reference signal;
   a control means for supplying each of a plurality of divided codes sequentially to said correlator as the reference signal in accordance with the order of arrangement in a spreading code, said divided codes being formed by dividing the spreading code, which has a prescribed length and is used to despread said spread spectrum signal; and
   a signal processing means for summing a correlation signal which is output corresponding to each of the divided codes and for outputting a summed result, said signal processing means comprising a plurality of delay elements for delaying a signal by a time corresponding to a length of each of said divided codes, each of said delay elements being connected in cascade;

wherein an output of said correlator is coupled to an input of each of said delay elements and to an output of a last stage of said delay elements.

2. A spread spectrum signal processing apparatus for processing a correlation signal from a correlator, comprising:

a correlator for correlating a spread spectrum signal with a reference signal;

a control means for supplying each of a plurality of divided codes sequentially to said correlator as the reference signal in accordance with the order of arrangement in a spreading code, said divided codes being formed by dividing the spreading code, which has a prescribed length and is used to despread said spread spectrum signal; and a signal processing means for summing a correlation signal which is output corresponding to each of the divided codes and for outputting a summed result, said signal processing means comprising a plurality of delay elements for delaying a signal by a time corresponding to a length of each of said divided codes, each of said delay elements being connected in cascade;

wherein an output of said correlator is coupled to an input of a first stage of said delay elements; and wherein said correlation signal is summed with a delay signal from each of said delay elements.

3. The signal processing apparatus of claim 2 further comprising an adder for summing a delay signal from each of said delay elements and said correlation signal.

4. A spread spectrum signal processing apparatus for processing a correlation signal from a correlator, comprising:

a correlator for correlating a spread spectrum signal with a reference signal;

a control means for supplying each of a plurality of divided codes sequentially to said correlator as the reference signal in accordance with the order of arrangement in a spreading code, said divided codes being formed by dividing the spreading code, which has a prescribed length and is used to despread said spread spectrum signal; and a signal processing means for summing a correlation signal which is output corresponding to each of the divided codes and for outputting a summed result;

wherein, until a peak of said correlation signal is detected, said control means generates said divided codes of a prescribed order in the arrangement order of said spreading code among the divided codes successively; and wherein, after a peak of said correlation signal is detected, said control means starts to generate said divided codes from the next of said prescribed order.

5. The signal processing apparatus of claim 4, wherein said signal processing means comprises:

an A/D converter for converting said correlation signal into a digital signal;

a memory means for storing the digital signal from said A/D converter as data signal; and a signal processor for summing said digital data corresponding to said each of the divided codes and for outputting the summed result, said signal processor starting summing said digital data by referring to a time at which said control means supplies said plurality of divided codes to said correlator.

6. The signal processing apparatus of any one of claims 1 to 5, wherein said divided codes have an identical length.

7. The signal processing apparatus of any one of claims 1 to 5, wherein:

the correlator is a surface acoustic wave convolver; and said divided codes have a same length as or a shorter length than an interaction length of said convolver.

8. A spread spectrum communication system for performing communication using a spread spectrum signal between at least two communication equipments, at least one of said communication equipments comprising:

synchronization detecting means for performing synchronization recognition of said spread spectrum signal; and despreading means for performing despreading on said spread spectrum signal by referring to a synchronization recognition signal from said synchronization detecting means;

wherein either said synchronization detecting means or said despreading means comprises a spread spectrum signal processing apparatus according to any one of claims 1 to 5.

* * * * *